United States Patent
Ragheb et al.

(10) Patent No.: US 12,457,038 B1
(45) Date of Patent: Oct. 28, 2025

(54) SYSTEM AND METHOD FOR TRANSMITTING SIGNALS IN A FREE SPACE OPTICS COMMUNICATION SYSTEM

(71) Applicant: KING SAUD UNIVERSITY, Riyadh (SA)

(72) Inventors: Amr Mohamed Ragheb, Riyadh (SA); Saleh Abdullah Alshebeili, Riyadh (SA); Ahmed Sami Almiaman, Riyadh (SA); Saud Ahmad Aloiss, Riyadh (SA); Faisal Jasser Aljasser, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 19/249,970

(22) Filed: Jun. 25, 2025

Related U.S. Application Data

(60) Provisional application No. 63/813,253, filed on May 28, 2025.

(51) Int. Cl.
*H04B 10/112* (2013.01)
*H04B 10/50* (2013.01)

(52) U.S. Cl.
CPC ......... *H04B 10/112* (2013.01); *H04B 10/503* (2013.01)

(58) Field of Classification Search
None
See application file for complete search history.

(56) References Cited

U.S. PATENT DOCUMENTS

| | | | |
|---|---|---|---|
| 9,780,872 B2 * | 10/2017 | Ren | H04B 10/1121 |
| 10,238,298 B2 * | 3/2019 | Wang | A61B 5/0095 |

(Continued)

FOREIGN PATENT DOCUMENTS

| | | |
|---|---|---|
| CN | 203786405 U | 8/2014 |
| CN | 105258808 A | 1/2016 |

(Continued)

OTHER PUBLICATIONS

Ibrahim et al., Deep Learning-Based Image Denoising Approach for the Identification of Structured Light Modes in Dusty Weather, IEEE, 2023 (Year: 2023).*

(Continued)

*Primary Examiner* — Jai M Lee
(74) *Attorney, Agent, or Firm* — Nath, Goldberg & Meyer; Joshua B. Goldberg

(57) ABSTRACT

A free space optics system includes a transmitter for generating an orbital angular mode (OAM) laser signal and a receiver. The OAM laser signal may be a Multiplexed Laguerre Gaussian (Mux-LG) OAM laser signal. The receiver includes a beam splitter for receiving the OAM laser signal and a charge coupled device (CCD) camera for receiving the OAM laser signal from the beam splitter and imaging the OAM laser signal. The receiver further includes a computing device in communication with the CCD camera. The computing device is configured to determine a power of the OAM laser signal from images taken by the CCD camera to detect interception of the OAM laser signal. The computing device may detect the interception using a deep learning model or a convolutional neural network (CNN).

14 Claims, 31 Drawing Sheets

(56) References Cited

U.S. PATENT DOCUMENTS

| | | | |
|---|---|---|---|
| 11,303,361 B2* | 4/2022 | Ling | H01S 3/1024 |
| 12,244,701 B2* | 3/2025 | Guo | G02B 27/0068 |
| 2013/0173194 A1* | 7/2013 | Dholakia | G02B 27/58 |
| | | | 702/71 |
| 2024/0007186 A1 | 1/2024 | Zhang et al. | |

FOREIGN PATENT DOCUMENTS

| | | |
|---|---|---|
| CN | 116054955 A | 5/2023 |
| CN | 114793157 B | 4/2024 |

OTHER PUBLICATIONS

Bekkali, Abdelmoula, Hideo Fujita, and Michikazu Hattori. "New generation free-space optical communication systems with advanced optical beam stabilizer." Journal of Lightwave Technology 40.5 (2022): 1509-1518.

Ibrahim, Ahmed B., et al. "Deep learning-based image denoising approach for the identification of structured light modes in dusty weather." IEEE Photonics Journal (2023).

Tareq, Qazi, et al. "Performance of injection-locked quantum-dash MMW source under clear and dusty weather conditions." IEEE Photonics Journal 13.3 (2021): 1-9.

Zhang, Runzhou, et al. "Turbulence-resilient pilot-assisted self-coherent free-space optical communications using automatic optoelectronic mixing of many modes." Nature Photonics 15.10 (2021): 743-750.

* cited by examiner

| PARTS | PART NUMBER | QUANTITY | UNIT PRICE (USD) |
|---|---|---|---|
| LASER SOURCE | TERAXION – PS-TNL | 1 | 10,000 |
| SLM | X13138-08 SERIES | 1 | 20,000 |
| HWP | WPH05M-1550 | 1 | 100 |
| BEAM COLLIMATOR | F230FC-1550 | 1 | 250 |
| LENS | AC 254-050-C | 2 | 100 |
| IRIS | IDA25 | 3 | 40 |
| MIRRORS | BB2-E04 | 4 | 150 |
| BEAM SPLITTER | CCM1-BS015/M | 1 | 250 |
| POLARIZER | LPIREA100-C | 1 | 100 |
| CCD CAMERA | C12741-03 | 1 | 20,000 |
| POWER METER | AGILENT - 81626B | 1 | 2,000 |
| TURBULENCE PHASE PLATE | LEXITEK – LS100 ROTARY STAGE | 1 | 50,000 |

FIG. 11N — CONFUSION MATRIX FOR THE INTERCEPTION SIDE

FIG. 11O — CONFUSION MATRIX FOR THE RECEIVER SIDE

SYSTEM AND METHOD FOR TRANSMITTING SIGNALS IN A FREE SPACE OPTICS COMMUNICATION SYSTEM

CROSS-REFERENCE TO RELATED APPLICATIONS

This application claims the benefit of U.S. Provisional Patent Application No. 63/813,253, filed on May 28, 2025.

BACKGROUND

Field

The disclosure of the present patent application relates to free space optics, and particularly to a system and method for transmitting signals in a free space optics communication system under turbulent weather conditions and to minimize interception threats.

Description of Related Art

Free Space Optics (FSO) technology is a leading candidate for implementation in smart cities due to the following technological advantages: higher data rates (Gbps), no spectrum licensing, and no interference. The market need for free space optics is increasing exponentially. An FSO investment of $300 million is expected in the year 2029. FSO technology has many challenges, including i) man-made challenges, such as interception, and ii) atmospheric challenges, such as rain, dust and fog.

Interception is a man-made attack as illustrated in FIG. 1. While a structured light signal is being transmitted between a transmitter 100 and a receiver 110, a third party 120 tries to eavesdrop on the signal being transmitted (illustrated as interception 130). This can lead to confidential information being leaked, posing a security risk, and it is important to note that this can happen anywhere in the city.

Atmospheric challenges, 140 such as rain, dust and fog, may also interfere with transmission of the structured light signal, causing failure of the FSO communication link. presently, free space optic (FSO) and single mode fiber (SMF) systems are widely used for modern communication systems. FSO is used in various applications where fiber installation is not feasible or is too costly. However, FSO systems exposed to severe weather conditions may cause failure of the FSO communication link, whereas fiber channels are immune to these conditions. Both communication systems, however, suffer from human-made threats, such as jamming and interception, which can be the source of security risks. Thus, a system and method for transmitting signals in a free space optics communication system under turbulent weather conditions and to minimize interception threats solving the aforementioned problems are desired.

SUMMARY

A system and method for transmitting signals in a free space optics communication system under turbulent weather conditions and to minimize interception threats is described herein. The free space optics system includes a transmitter for generating an orbital angular mode (OAM) laser signal and a receiver. The receiver has a beam splitter for receiving the OAM laser signal, a charge coupled device (CCD) camera for receiving the OAM laser signal from the beam splitter and imaging the OAM laser signal, and a computing device in communication with the CCD camera. The computing device determines a power of the OAM laser signal from images taken by the CCD camera to detect interception of the OAM laser signal.

The transmitter includes a laser for generating a laser signal and a spatial light modulator (SLM) for receiving the laser signal and generating the OAM laser signal. The OAM laser signal may be a Multiplexed Laguerre Gaussian (Mux-LG) OAM laser signal. The CCD camera may be a low noise CCD camera having a filter.

The free space optic system may further include a polarizer located between the beam splitter and the CCD camera. The computing device may be configured to detect interception using a deep learning model. The computing device may detect interception using a convolutional neural network (CNN), as a non-limiting example.

In use for detecting interception of a signal, an orbital angular mode (OAM) laser signal is generated by the transmitter. The OAM laser signal is received at a beam splitter, and the OAM laser signal is directed from the beam splitter to a charge coupled device (CCD) camera. The OAM laser signal is imaged with the CCD camera, and images of the OAM laser signal are transmitted from the CCD camera to the computing device. The computing device determines a power of the OAM laser signal from images transmitted by the CCD camera to detect interception of the OAM laser signal.

These and other features of the present subject matter will become readily apparent upon further review of the following specification.

BRIEF DESCRIPTION OF DRAWINGS

FIG. 3B is a table showing the equipment used and associated costs for the experimental setups of FIG. 3A.

FIG. 11N is a confusion matrix for the interception side.

FIG. 11O is a confusion matrix for the receiver side.

Similar reference characters denote corresponding features consistently throughout the attached drawings.

DETAILED DESCRIPTION

There is growing interest in free space optics (FSO) communication systems in modern applications because of the advantages FSO has over traditional communication systems, such as: higher data rates, low installation cost and low latency. However, FSO is subject to man-made threats such as jamming and interception. These threats are a common problem in modern day systems. The present disclosure relates to a testing system that is applicable in analyzing FSO communication systems subjected to i) man made threats, such as interception and jamming, and ii) atmospheric conditions, such as rain, dust and fog. The experimental results using this testing system are implemented in an FSO system that operates in severe atmospheric conditions and minimizes interception threats.

Figure 1:
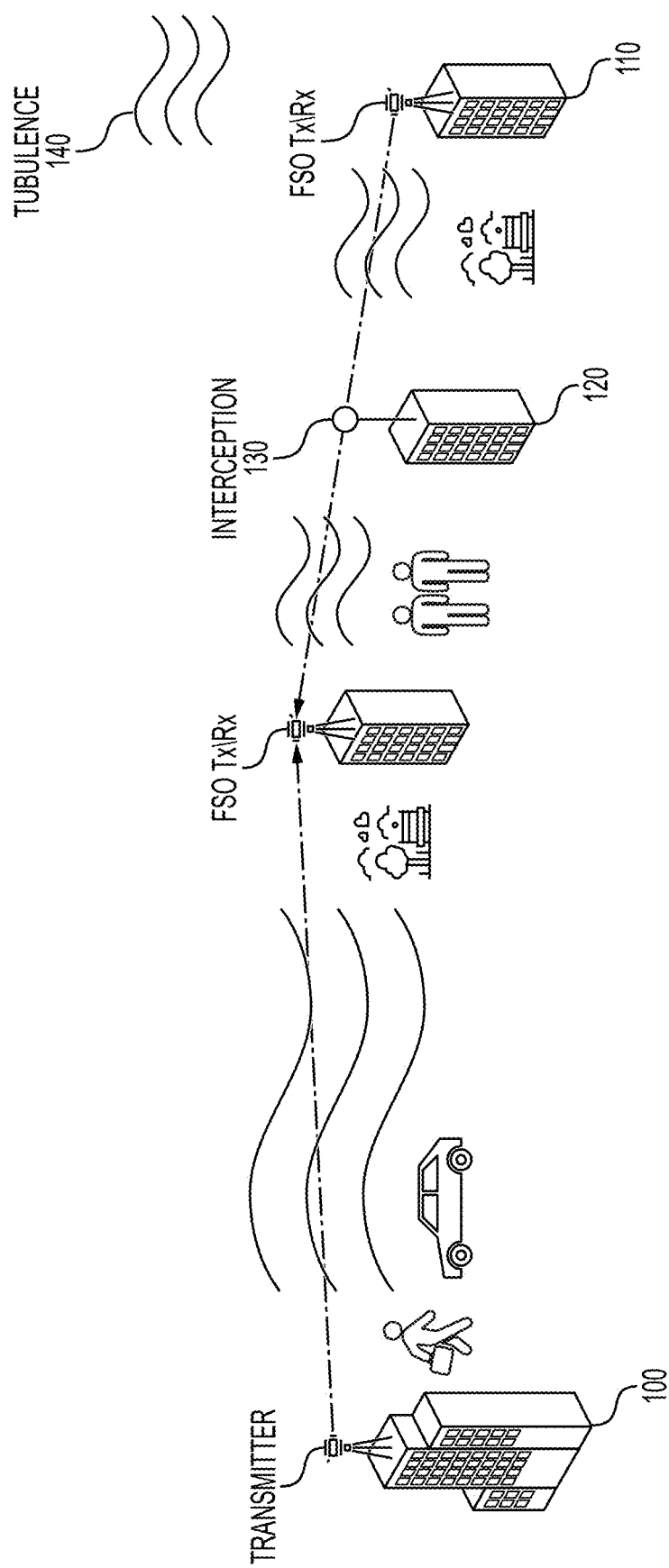
FIG. 1 illustrates a man-made attack in a Free Space Optics (FSO) communication system.
Figure 2:
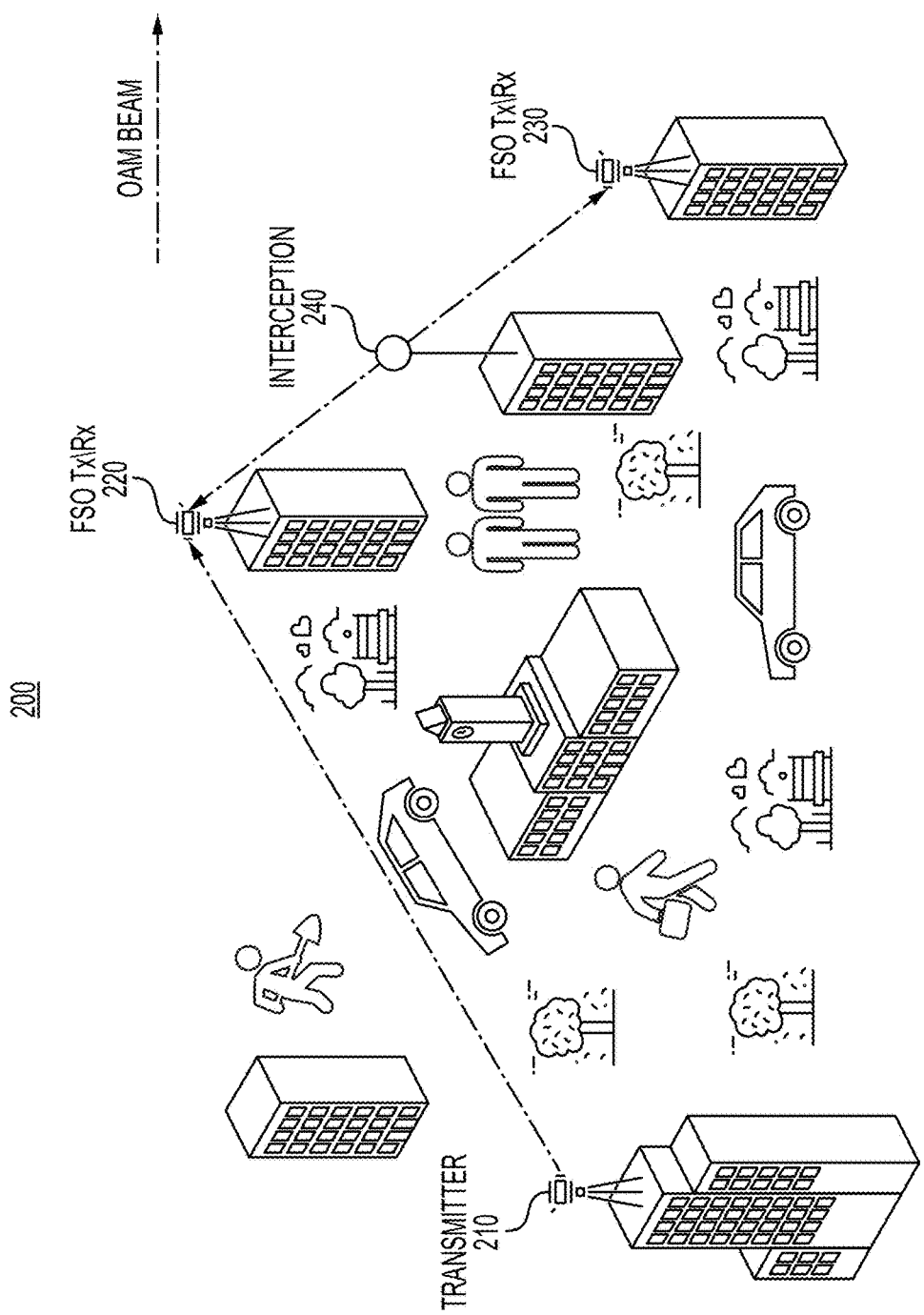
FIG. 2 illustrates an FSO communication system operating in a smart city under man-made interception threats.

FIG. 2 is an illustration of an FSO communication system 200 operating in a smart city under man-made interception threats. A transmitter 210 sends a signal to a first FSO node 220, which transmits and receives signals. The signal is then transmitted from the first FSO node 220 to the second FSO node 230. Signals are transmitted and received between the first FSO node 220 and the second FSO node 230, as illustrated. An interception threat 240, located between the first node 220 and the second node 230, is eavesdropping on the signal to obtain sensitive and confidential information, thereby posing a security risk.

Figure 3A:
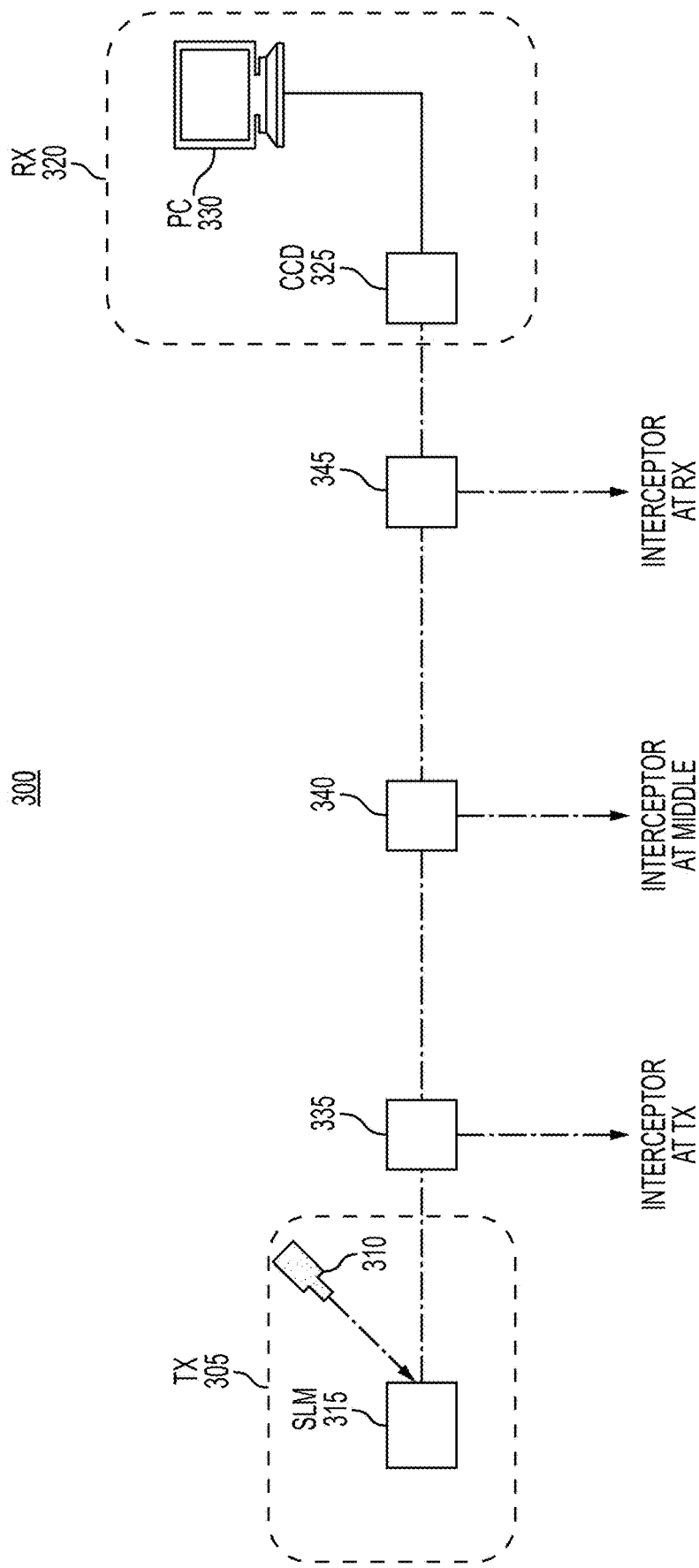
FIG. 3A diagrammatically illustrates an experimental configuration showing different interception setups.

FIG. 3A is an illustration of an experimental configuration 300 showing different interception setups. A transmitter 305 includes a laser 310 and a spatial light modulator (SLM) 315. The signal produced by the laser 310 and SLM 315 is transmitted to the receiver 320. The receiver 320 includes a charge coupled device (CCD) camera 325 and a computing device (PC) 330. Interceptors are located along the transmitted signal's path. An interceptor 335 is located at the transmitter 305 side of the path, an interceptor 340 is located at a middle portion of the path, and an interceptor 345 is located at the receiver 320 side of the path in the non-limiting example of FIG. 3A.

For the communication channel, a laser source signal is collimated to the SLM 315, which spatially generates various Laguerre Gaussian (LG) mode patterns. The mode patterns are sequentially transmitted over a free space channel of 3-m. The received modes are then recorded and detected using the CCD camera 325. An optical power meter is used at the receiver side to measure the received power for each mode. For the eavesdropper part, a variable beam splitter is used to mimic the eavesdropper behavior which can intercept a small percentage of the light signal. The interceptor can be at the transmitter side, receiver side, or in between. The intercepted signal is analyzed using a signal processing algorithm on the PC 330. In some cases, a similarity index is used to identify the low-power intercepted mode, where recognition accuracy is calculated versus different intercepted power levels. FIG. 3B is a table showing exemplary equipment used and associated costs. It should be understood that PC 330 may be any suitable type of processor, computer, personal computer, controller or the like.

Generating Different OAM Mode Patterns

Figure 4A:
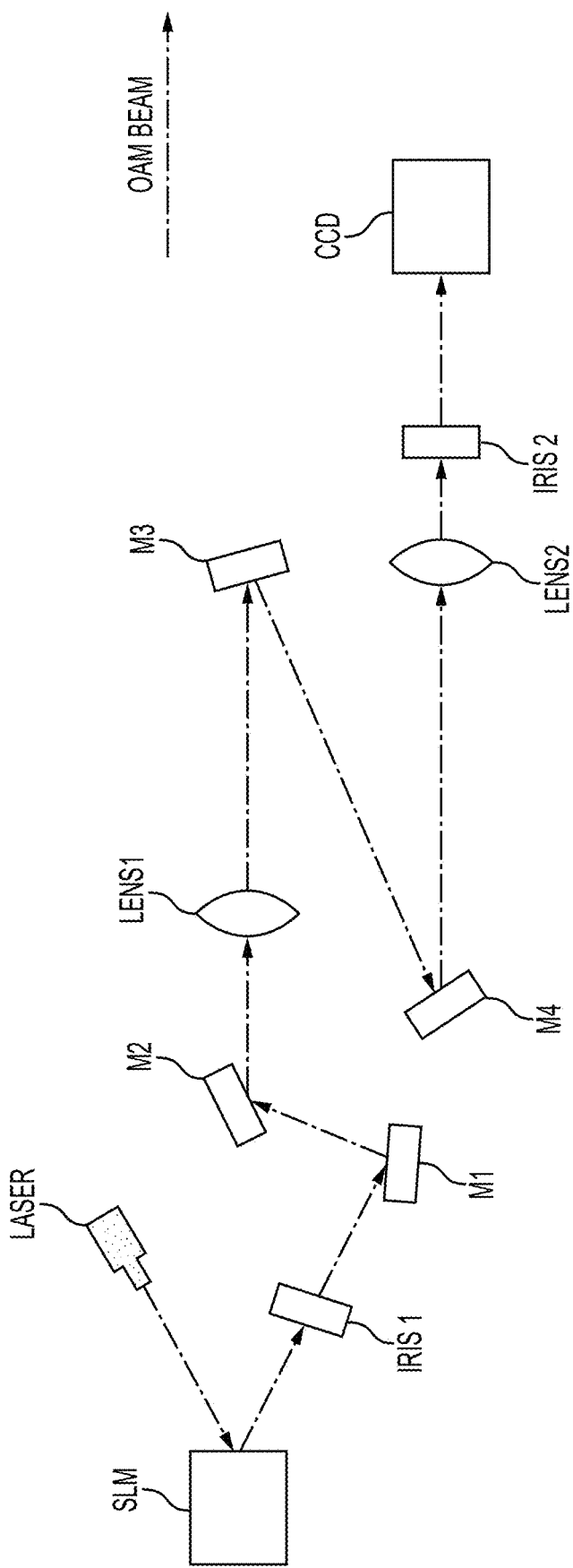
FIG. 4A diagrammatically illustrates a setup used to generate different orbital angular mode (OAM) patterns.
Figure 4B:
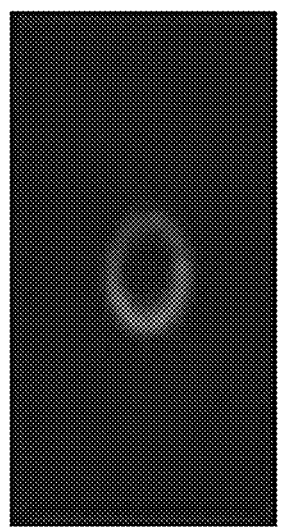
FIG. 4B shows samples of captured images for Laguerre Gaussian (LG) and Multiplexed Laguerre Gaussian (Mux-LG) beam mode families.
Figure 4B:
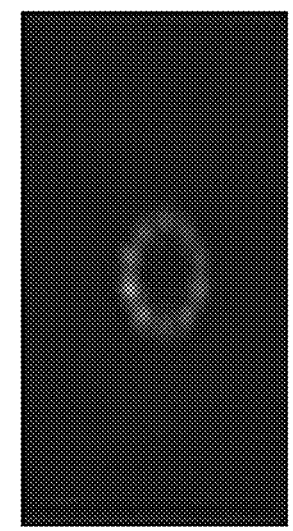
Figure 4B:
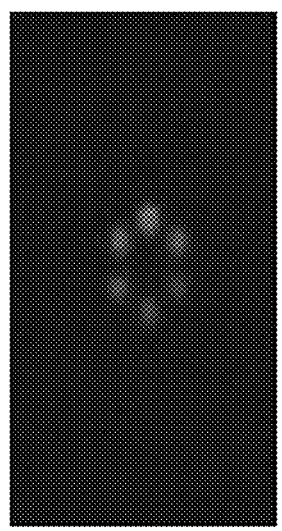
Figure 4B:
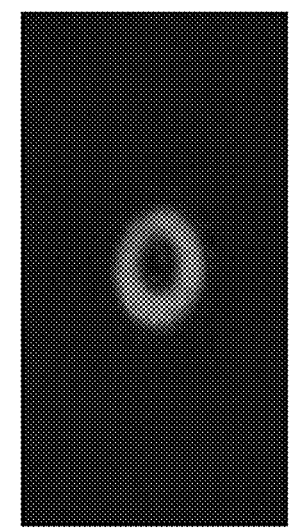
Figure 4B:
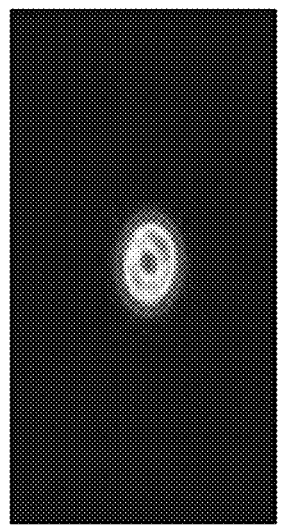
Figure 4B:
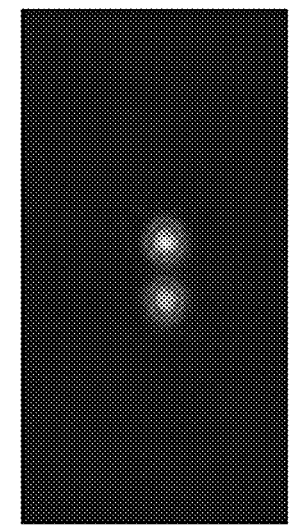

FIG. 4A is an illustration of the setup used to generate different OAM mode patterns. These include 8-ary LG and 8-ary Multiplexed LG (Mux-LG) mode patterns. To generate an OAM beam family with different mode patterns, a laser is directed on the SLM, where the beam coming out of the laser is a Gaussian beam. The SLM uses a MATLAB code to imprint different mode holograms on the SLM screen so that the phase of the incident Gaussian signal is modulated by different phase holograms to generate the LG and Mux-LG mode patterns. An Iris1 beam is used to block the reflected Gaussian beam and pass only the OAM beam. A four-mirror system (M1-M4) is used to build an FSO channel having a range of 3 meters. Optical lenses (Lens1, Lens2) are used to reduce the divergence of the laser beam. An Iris2 beam is used to reduce the dispersion caused by the passing of the OAM beam in free space, as shown in FIG. 4A. At the receiver side, a CCD camera is used to display images of the different mode families. FIG. 4B shows samples of the captured images for LG and Mux-LG beam mode families.

Power Analysis for LG and Mux-LG Modes

Figure 5A:
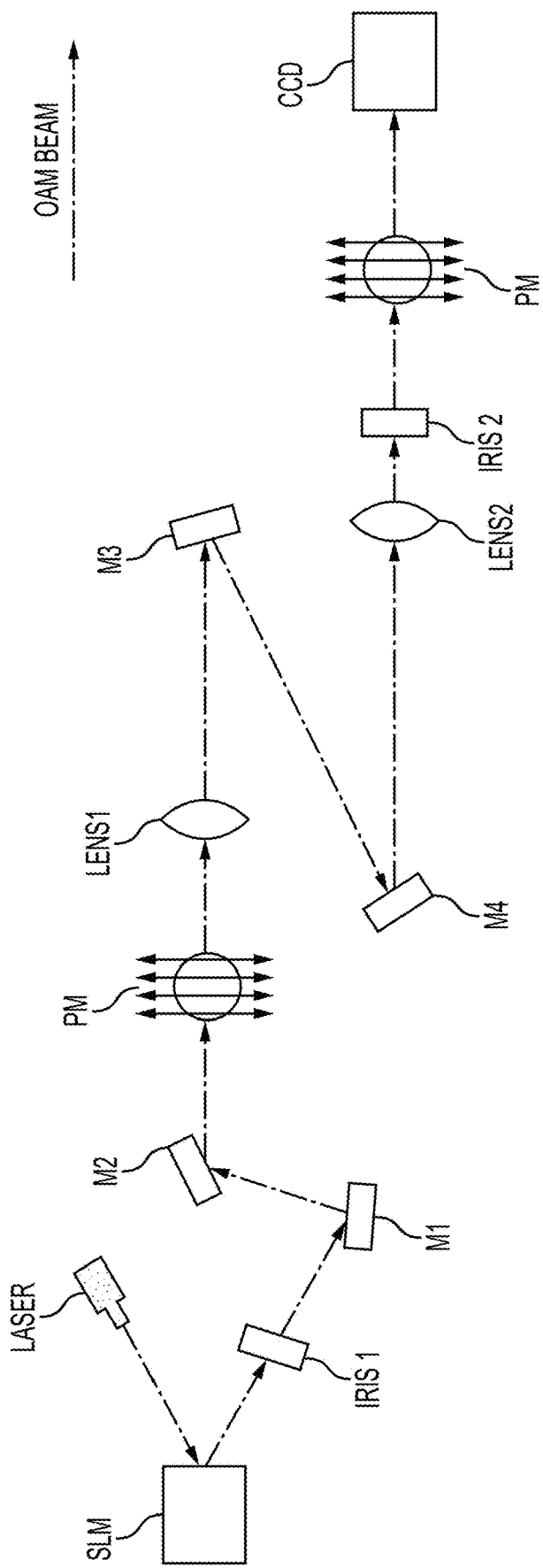
FIG. 5A diagrammatically illustrates a setup used for analyzing power for the LG and Mux-LG modes.
Figure 5B:
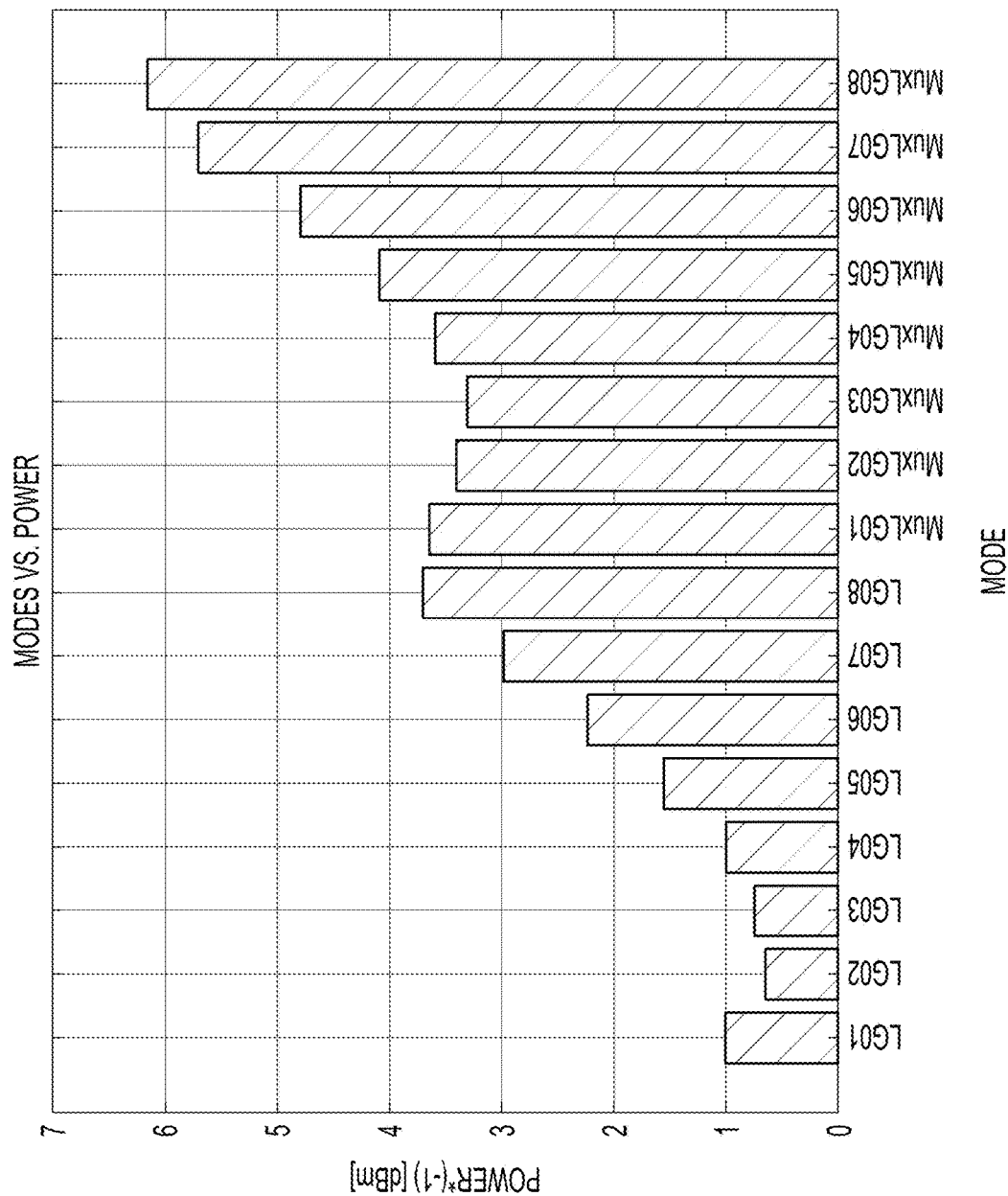
FIG. 5B is a graph showing the measured power, using a moveable power meter, for LG modes at the transmitter side.
Figure 5C:
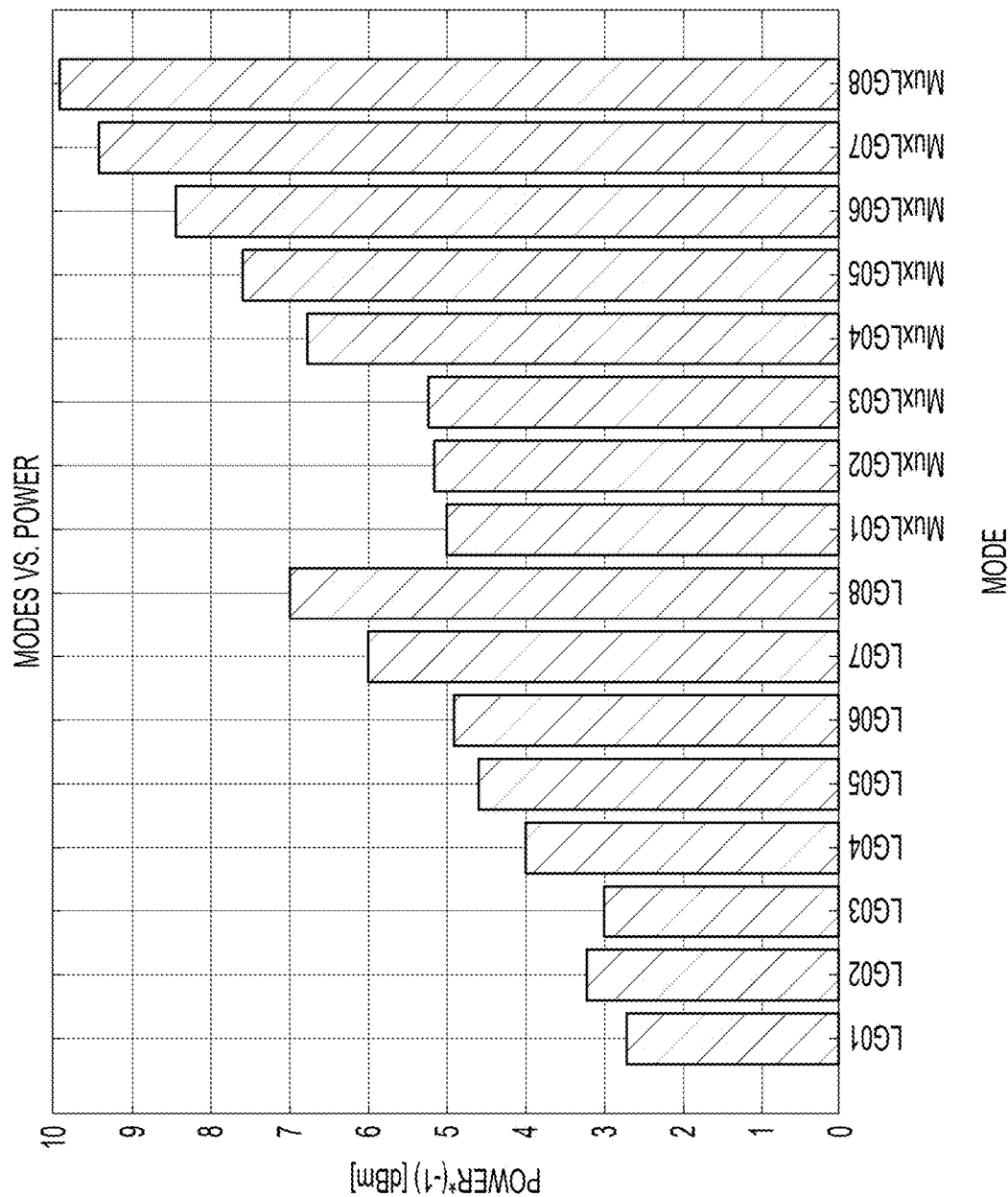
FIG. 5C is a graph showing the measured power at the receiver side.

In this section, power for the LG and Mux-LG modes is analyzed using the setup shown in FIG. 5A. A power meter (PM) at the receiver side and at the transmitter side was used to measure the power of the generated mode patterns. FIG. 5B gives the measured power, using the moveable power meter, for LG modes at the transmitter side. The power at the receiver side is also measured and recorded (see FIG. 5C). Similarly, FIG. 5B and FIG. 5C also show the power of the Mux-LG modes at the transmitter and receiver side, respectively. The power difference between the low order modes (i.e., LG/Mux-LG01, 02, 03, and 04) and high-order modes (LG/Mux-LG05, 06, 07, and 08) varies between ~1.5 dB to ~4.5 dB, hence, an equalization method should be applied to unify the power of all modes at the receiver side.

Equalize Power for LG and MUX-LG Modes

Figure 6A:
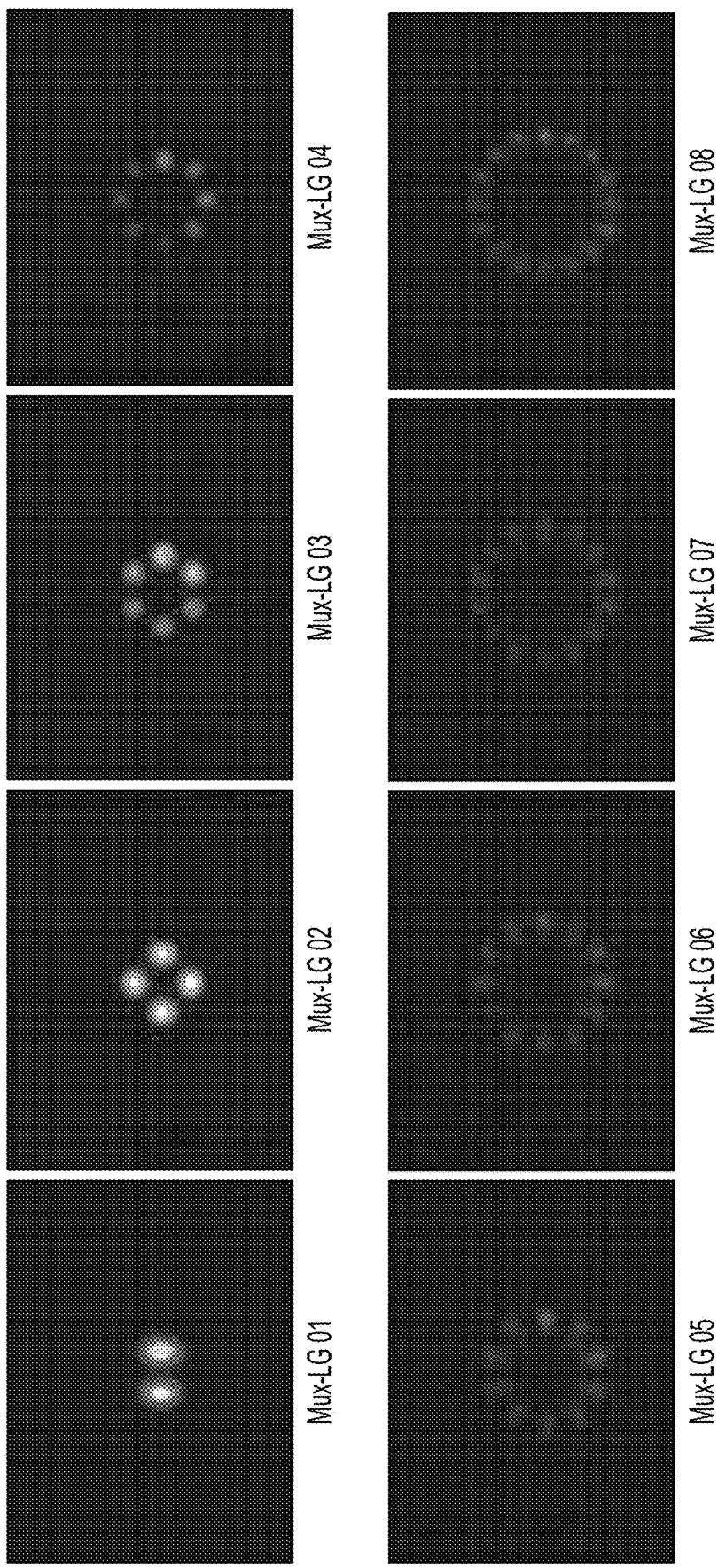
FIG. 6A and FIG. 6B show the captured Mux-LG and LG modes, respectively, at a unified 0-dBm received optical power.
Figure 6B:
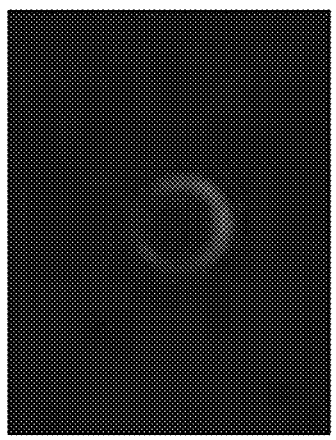
Figure 6B:
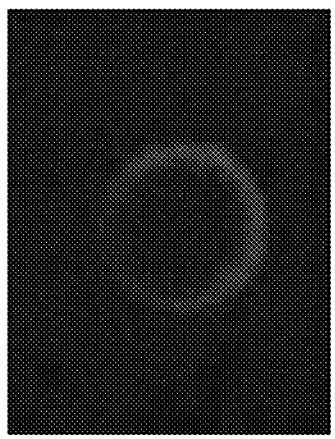
Figure 6B:
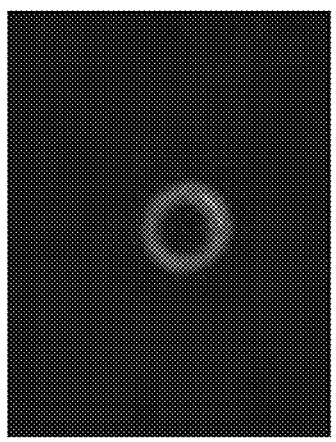
Figure 6B:
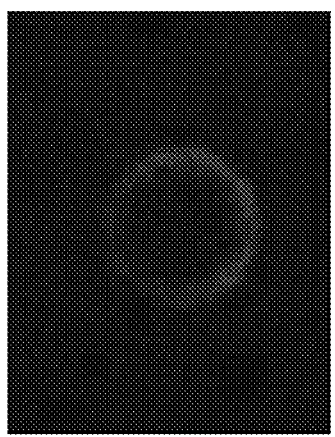
Figure 6B:
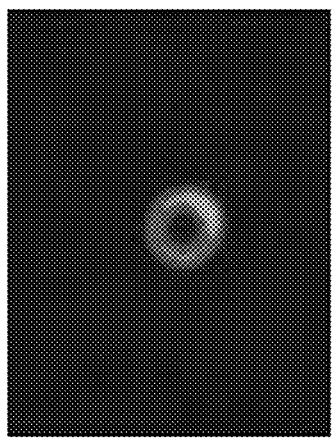
Figure 6B:
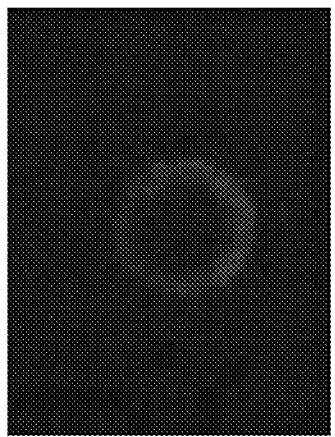
Figure 6B:
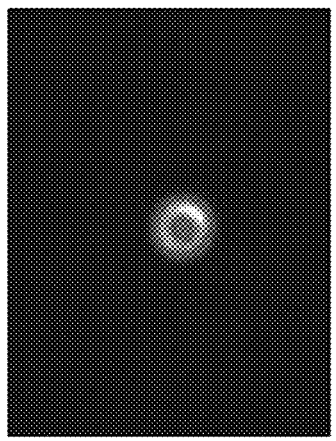
Figure 6B:
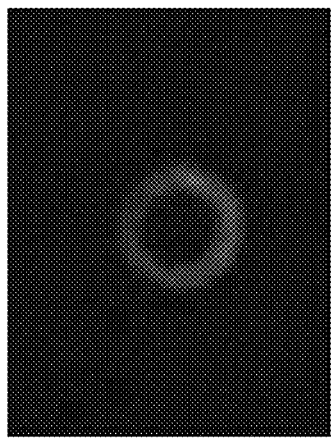

The FSO setup may be modified to equalize the received power for all Mux-LG and LG modes. In this regard, an optical amplifier and variable optical attenuator may be added to the laser input to control the power for each mode. FIG. 6A and FIG. 6B show the captured Mux-LG and LG modes, respectively, at a unified 0-dBm received optical power.

Interception

Interception occurs when an FSO eavesdropper intercepts a transmitted signal before it is received by the FSO receiver. This influences the FSO system security. In this section, this issue is considered from the point of view of the interceptor to determine the lowest percentage of power that can be intercepted without the receiver noticing the presence of the eavesdropper. The interceptor is basically trying to intercept the signal with the lowest possible percentage of power so that the receiver cannot detect the eavesdropper.

Figure 7A:
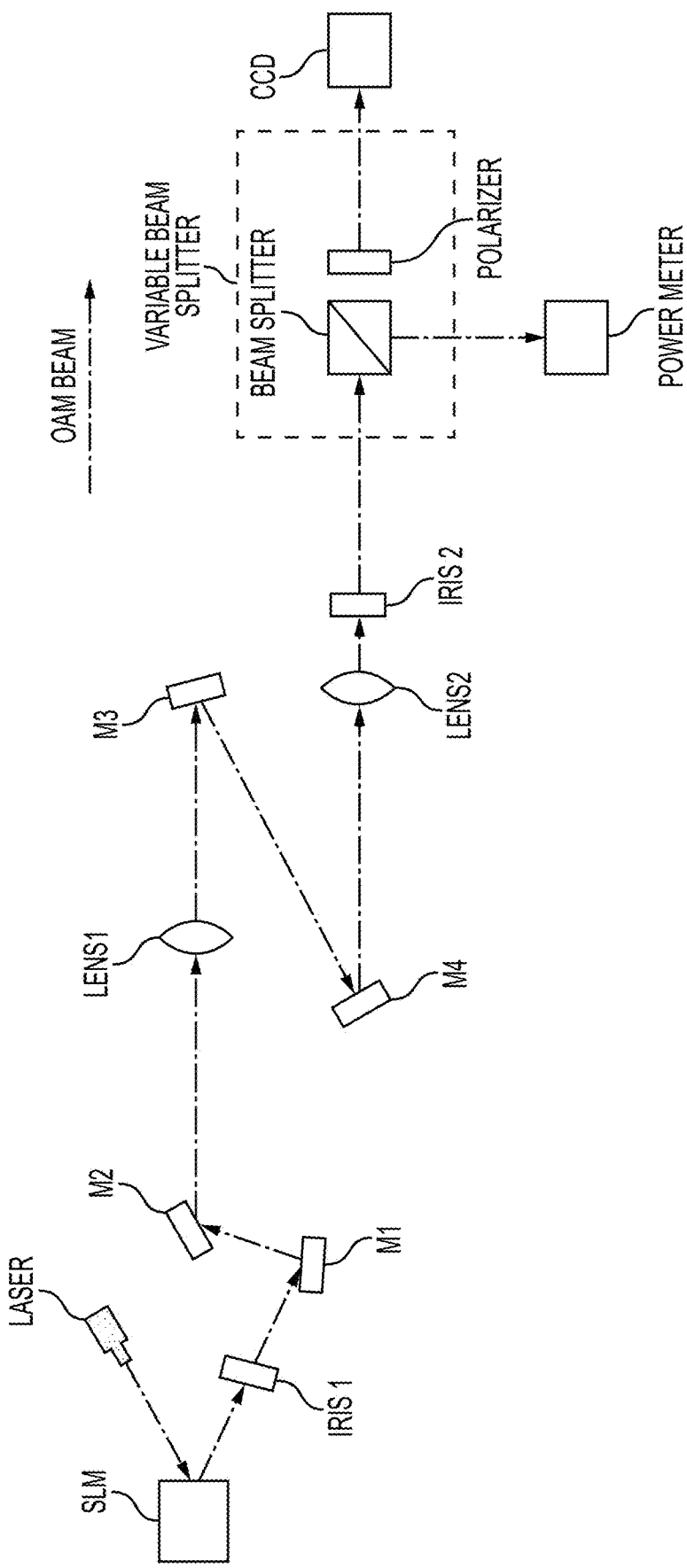
FIG. 7A diagrammatically illustrates a setup adding a beam splitter and a polarizer to act as a variable beam splitter on the receiver side.
Figure 7B:
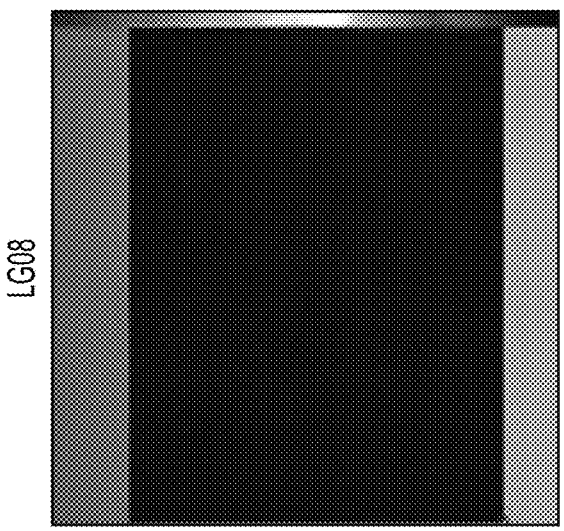
FIG. 7B is an illustration showing intercepted LG modes at 48%.
Figure 7B:
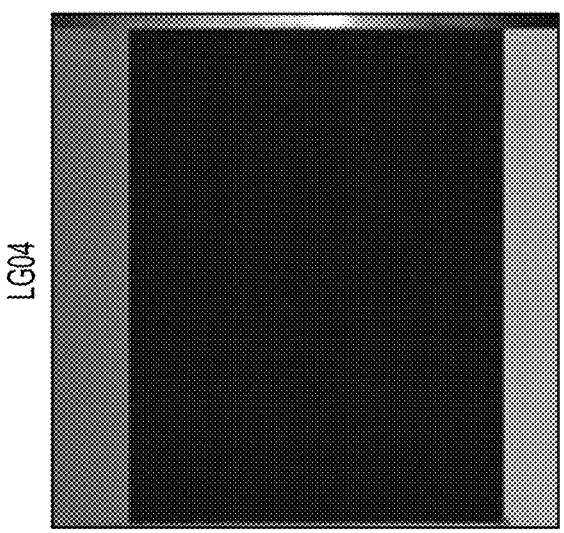
Figure 7B:
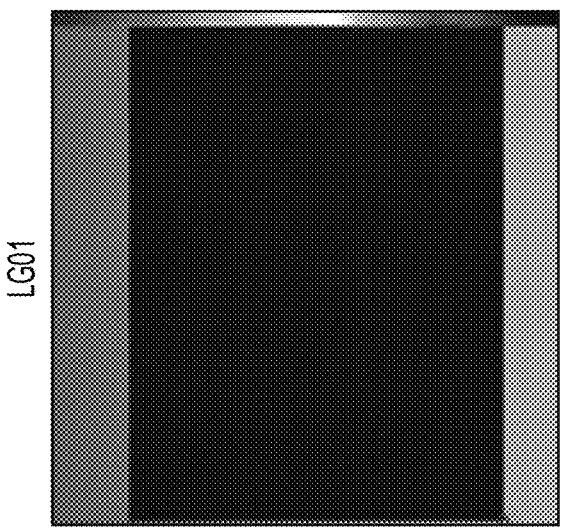

A beam splitter and polarizer are added to act as a variable beam splitter on the receiver side. The lowest detectable power is then determined, as shown in FIG. 7A. The lowest detectable power for the CCD camera is then calculated at the interceptor side. It was found to be 48% of the received signal power, as shown in FIG. 7B. It is noted that although the amount of intercepted signal power is high, the CCD camera is barely showing the intercepted signal.

High Sensitivity Low Noise Camera

Figure 8A:
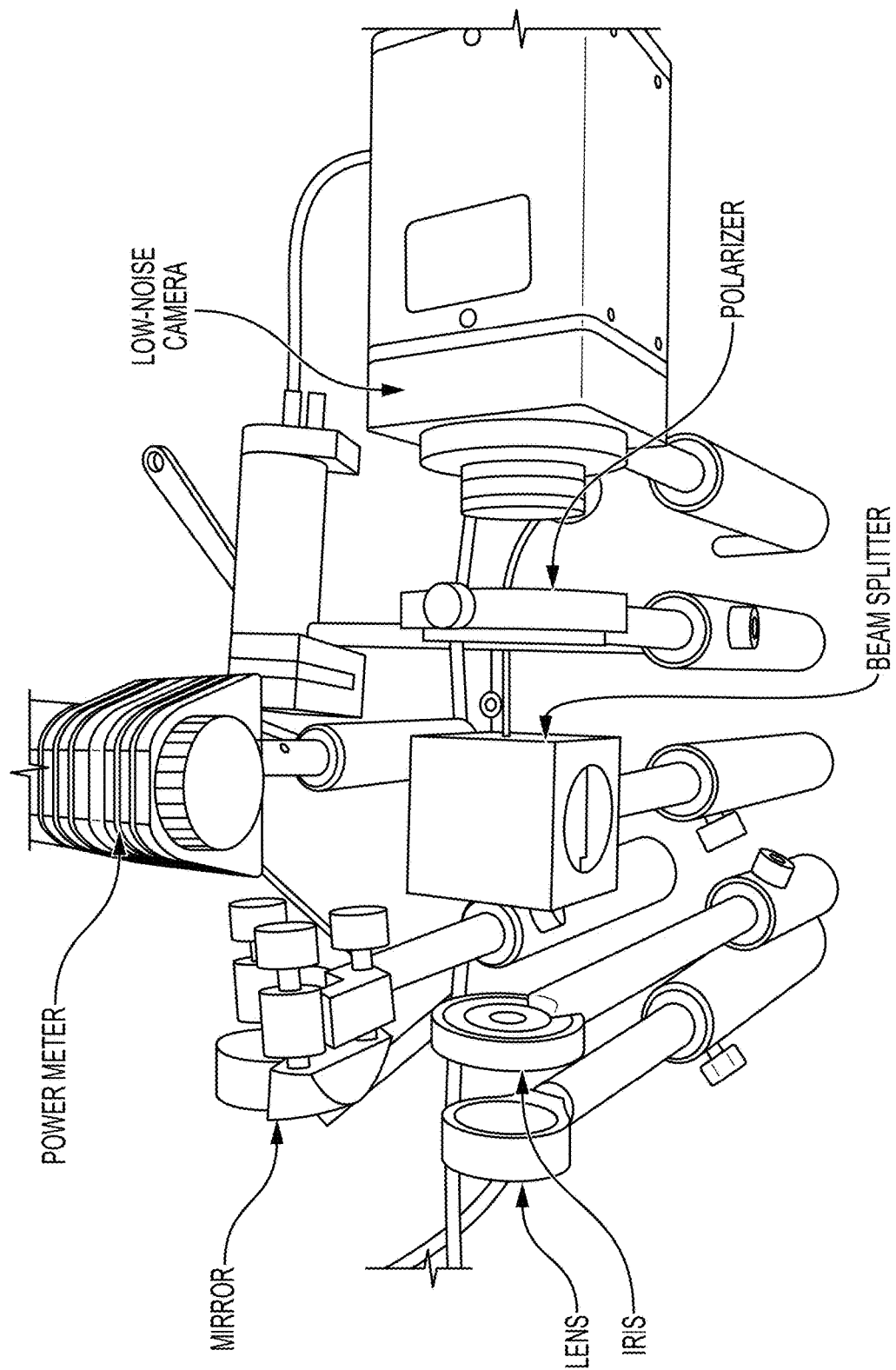
FIG. 8A is a perspective view of a setup implementing a low noise CCD camera.

Another CCD camera, known as a "low-noise camera," is implemented in the setup shown in FIG. 8A. The use of the low-noise CCD resulted in a received power of 12 µW and an intercepted power of 19 nW. The percentage of power that the interceptor needs to detect the signal is $$\frac{19 \times 10^{-9}}{1210^{-6}} \times 100 = 0.15\%.$$

Figure 8B:
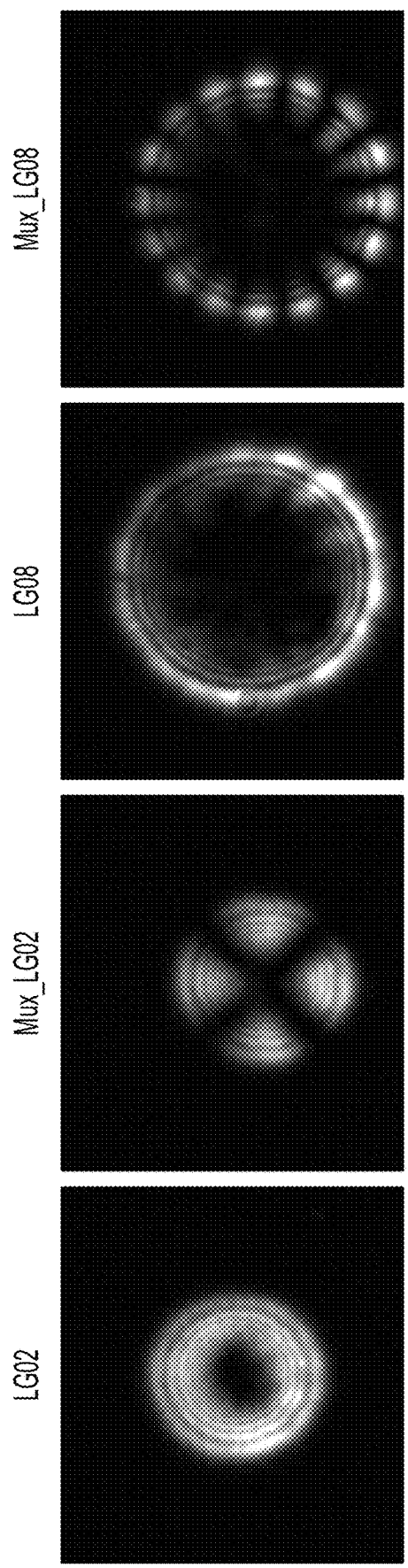
FIG. 8B shows samples of the received images at the receiver side.

Samples of the received images, at the receiver side, are shown in FIG. 8B.

The 0.15% intercepted power in FIG. 8B was not the lowest detectable power for the low-noise camera, rather, it was the lowest that could be reached by using only one polarizer. The 0.15% intercepted power was a limitation of the polarizer and not the low-noise camera. To go lower than 0.15%, a filter is added to the low-noise camera.

Adding a Filter to the Low Noise Camera

Figure 9A:
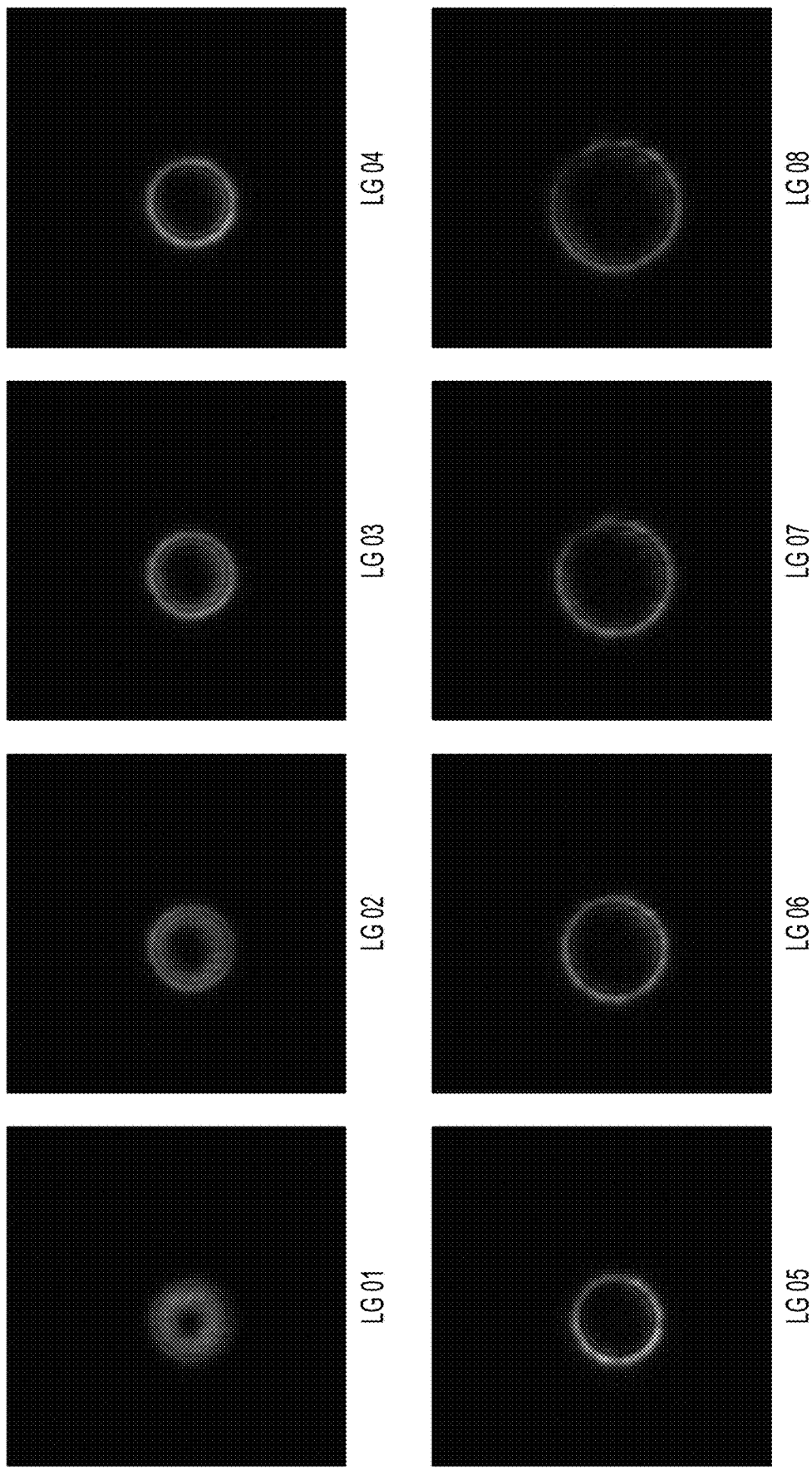
FIG. 9A shows LG modes after adding a filter on a low noise camera at 0.056% intercepted power.
Figure 9B:
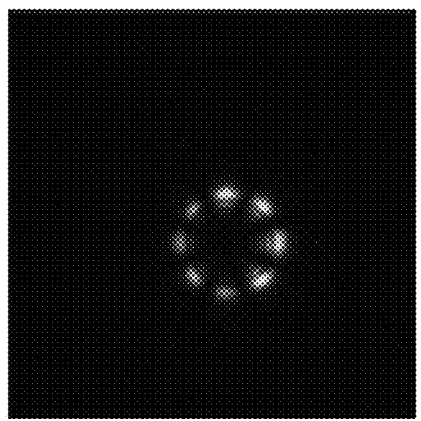
FIG. 9B shows Mux-LG modes after adding a filter on a low noise camera at 0.056% intercepted power.
Figure 9B:
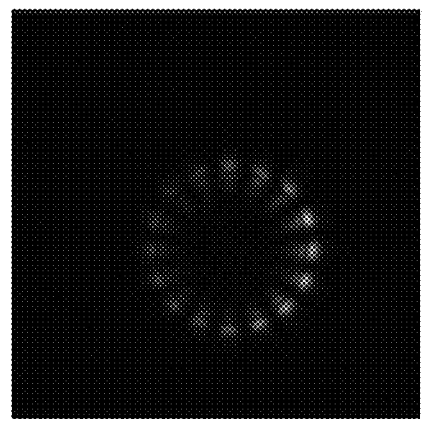
Figure 9B:
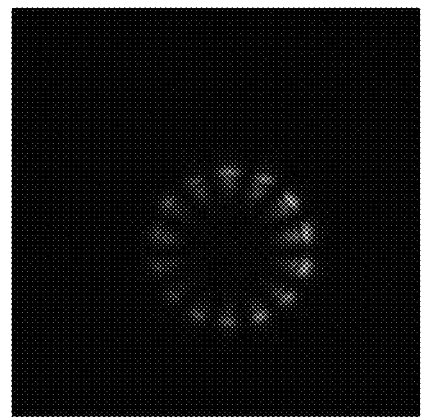
Figure 9B:
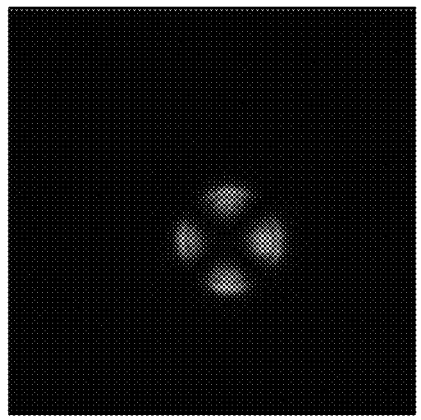
Figure 9B:
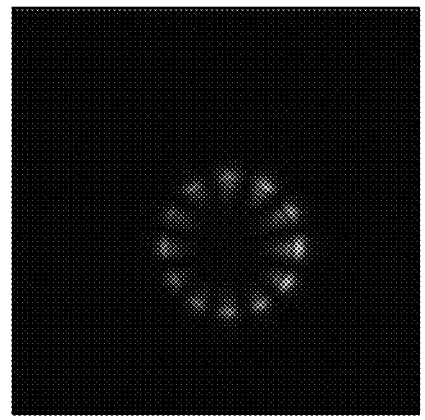
Figure 9B:
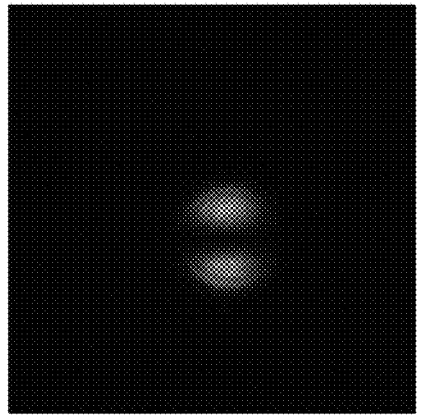
Figure 9B:
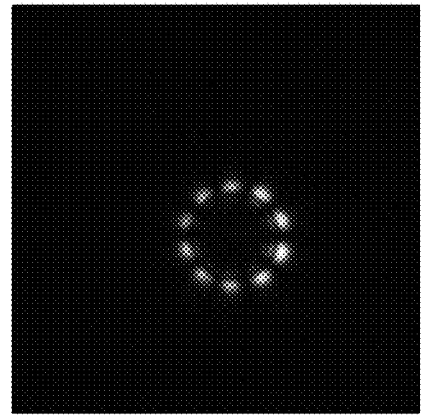

Since the polarizer limits the ability of the camera to detect an intercepted power below 0.15%, a filter may be added on the camera, as shown in FIG. 9A and FIG. 9B. A low-noise CCD camera having an added filter can detect an interceptor having a power of less than 0.15%, thereby making the system more secure and minimizing the risk of compromising sensitive private information.

Figure 10A:
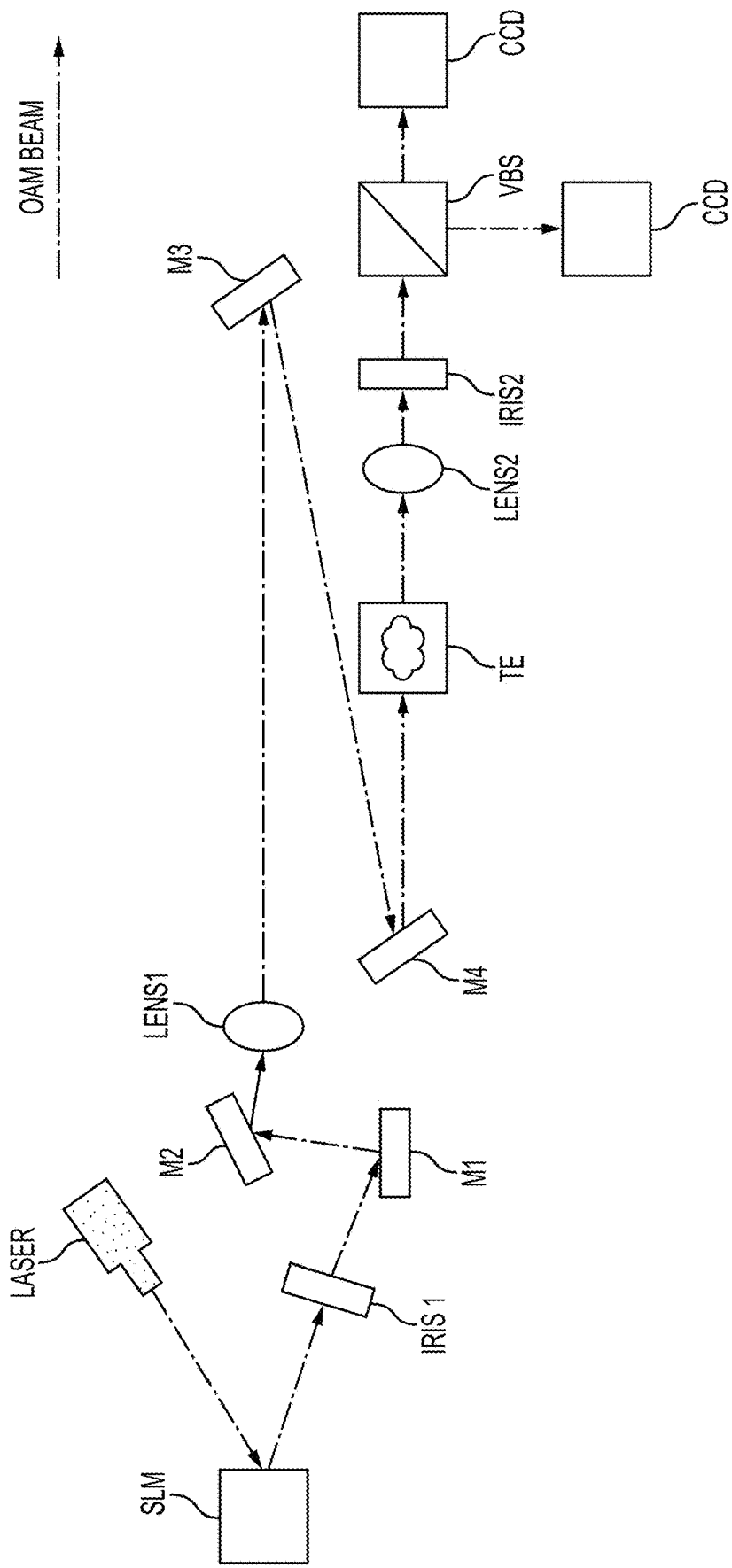
FIG. 10A diagrammatically illustrates a setup used to consider effects and distortions of structured light-based modes passing through a turbulence medium using a turbulence phase plate (TE).
Figure 10B:
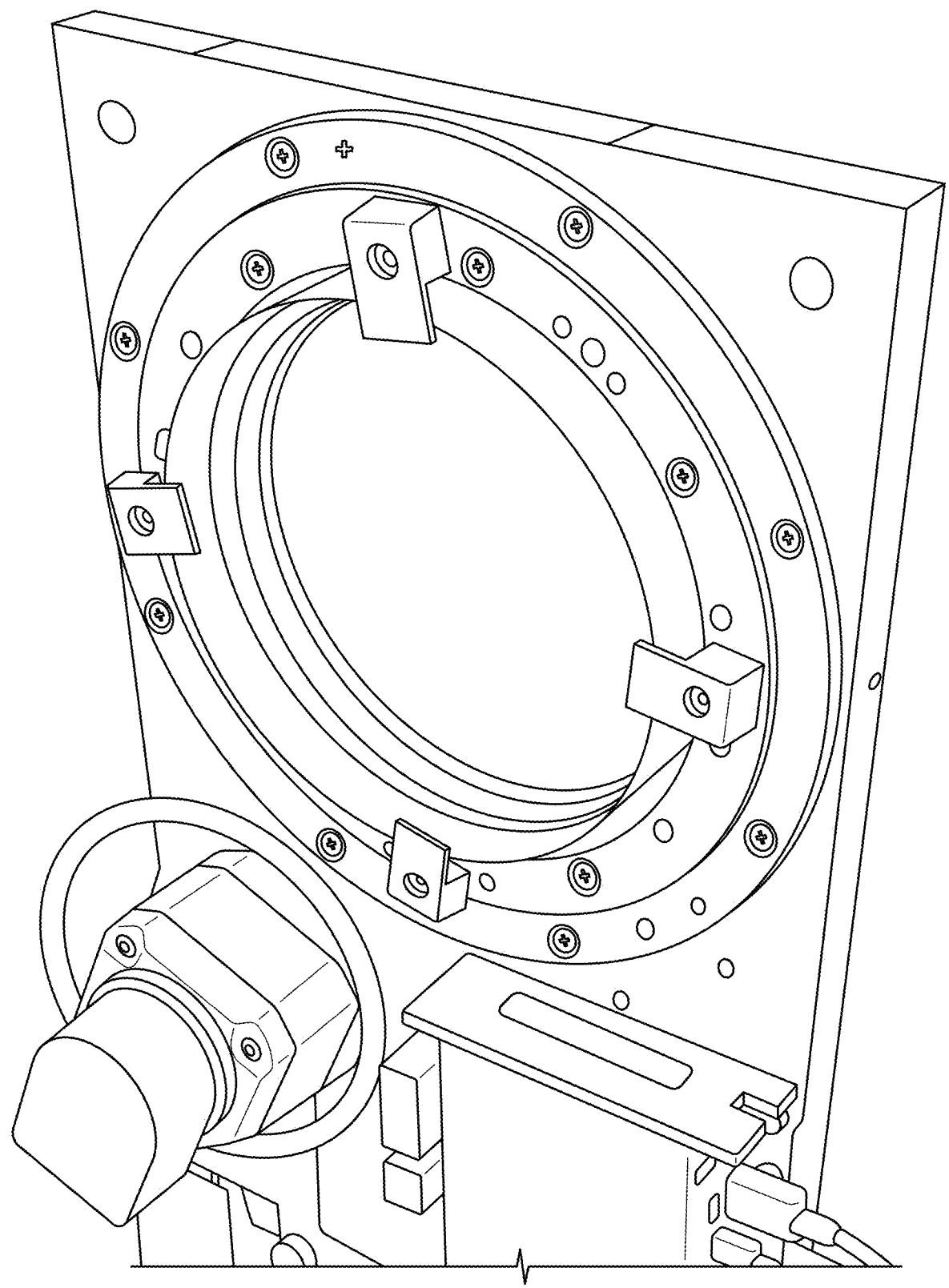
FIG. 10B is a perspective view of a setup using a turbulence device to emulate the real turbulence effect on structured light beams.
Figure 10C:
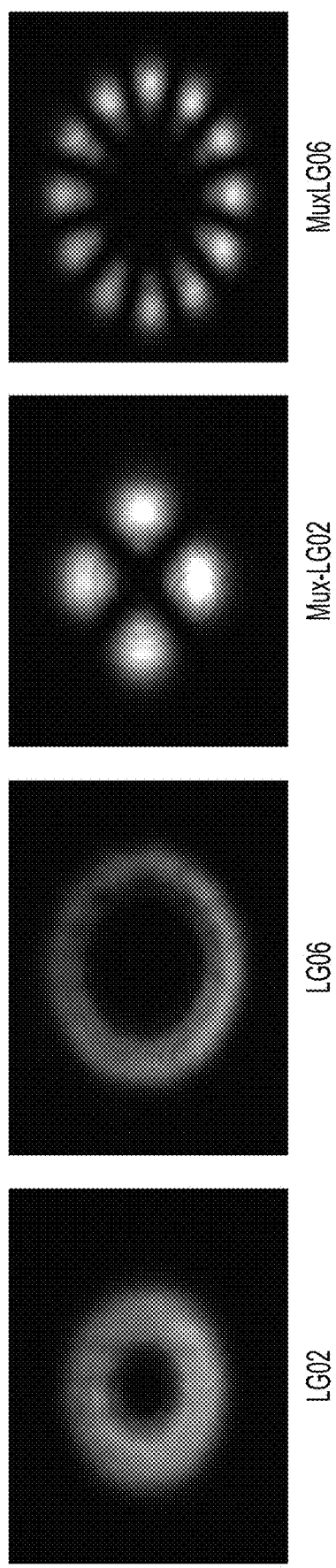
FIG. 10C shows an example of structured light under clear weather conditions.
Figure 10D:
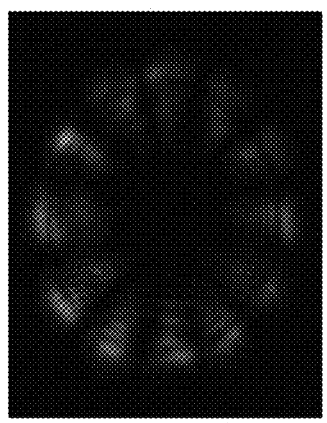
FIG. 10D shows an example of weak turbulence.
Figure 10D:
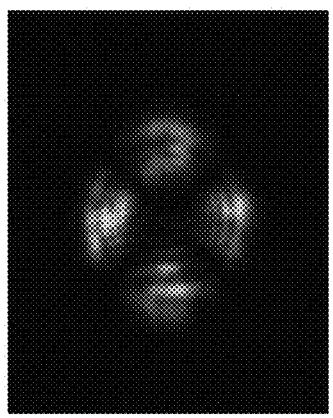
Figure 10D:
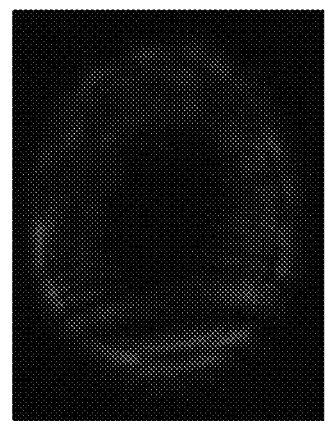
Figure 10D:
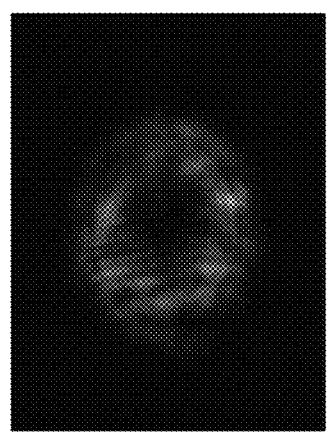
Figure 10E:
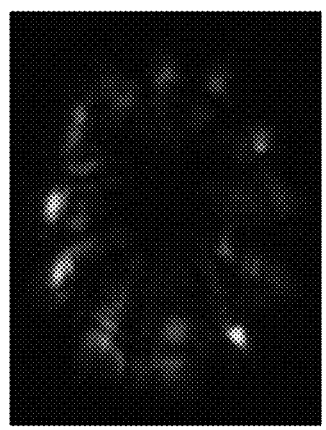
FIG. 10E shows an example of moderate turbulence.
Figure 10E:
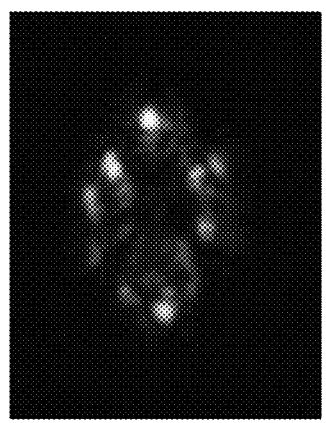
Figure 10E:
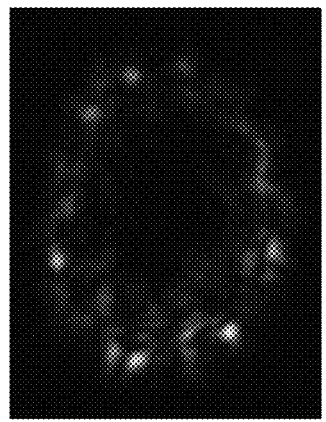
Figure 10E:
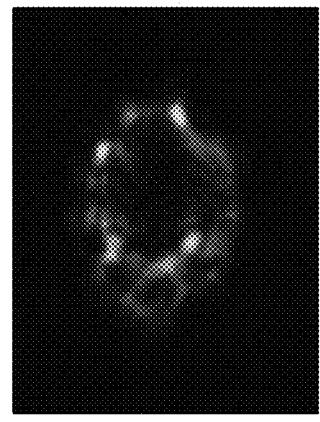

Turbulence Effect on Structured Light Modes to Mimic Adverse Atmospheric Conditions In this section, the effects and distortions of structured light-based modes passing through a turbulence medium are considered using a turbulence phase plate (TE), as shown in the setup illustrated in FIG. 10A. A turbulence device is used in the setup as illustrated in FIG. 10B to emulate the real turbulence effect on structured light beams. In FIG. 10C, an example of structured light under clear weather conditions is shown. There are three levels of turbulence: weak, moderate and strong. FIG. 10D shows an example of weak turbulence, FIG. 10E shows an example of moderate turbulence, and FIG. 10F shows an example of strong turbulence.

Figure 10F:
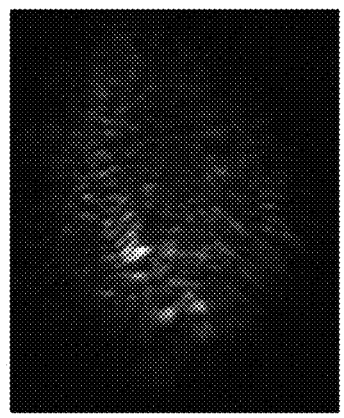
FIG. 10F shows an example of strong turbulence.
Figure 10F:
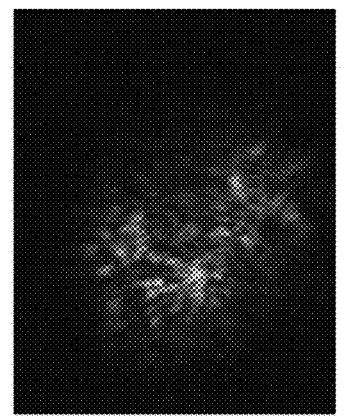
Figure 10F:
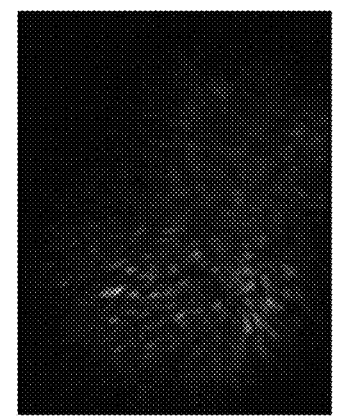
Figure 10F:
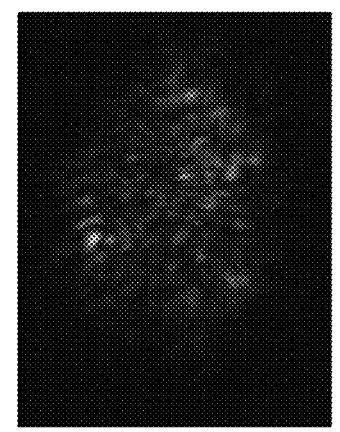

As illustrated in previous figures, the turbulence highly affects the structured light modes, specifically in FIG. 10F (strong turbulence), such that the modes look scattered and unrecognizable. The same applies to moderate turbulence, but to a lesser degree, as shown in FIG. 10E.

The setup in FIG. 10B is used to collect two datasets utilizing the randomness that the turbulence device offers. This includes the three levels of turbulence strengths for each level and five different intercepted powers. The results are first collected at the interception side and then at the receiver side. The total amount of collected data is 96,000 for each of the interception side and receiver side. The collected data at the interception side is at three turbulence levels and at each level five different intercepted powers. 400 pictures are taken for each mode of the 16 modes, which adds up to 96,000 pictures (400 pictures×3 levels×5 powers× 16 modes) in total at the interceptions side. This process is duplicated on the receiver side.

Deep Learning

A deep learning model may be used to investigate the behavior of the interceptor and the receiver. However, the dataset needs to be preprocessed before a deep learning model can be used. The collected data is first preprocessed by taking the raw images at the interception and receiver side. The images are cropped to get rid of most of the background noise coming from the two different CCDs used, since the two datasets are coming from two different cameras. Therefore, each of the datasets has a different dimension, leaving dimensions of 176×176 for interception data, and 251×251 for receiver data.

Figure 11A:
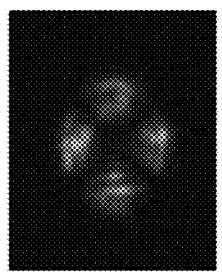
FIG. 11A shows an interception dataset resized into a 28×28 dataset.

The dimensions of the interception data and receiver data cannot be used in a machine learning model. The two datasets are resized into 28×28 datasets so the model can more easily extract features. An approximated example is shown in FIG. 11A. The two collected datasets are in red-green-blue (RGB) so they are converted into grayscale to eliminate the complexity by compressing the images to the barest minimum pixels. Thereafter, every image is divided by 255 to normalize the pixels and make each pixel fall within a range between 0 and 1 inclusively. This helps to reduce the complexity. Overall, the machine learning models prefer numbers that are less than 1.

Figure 11B:
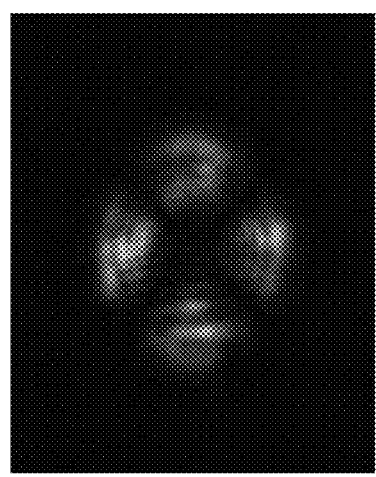
FIG. 11B shows a sample dataset after preprocessing in Python.
Figure 11B:
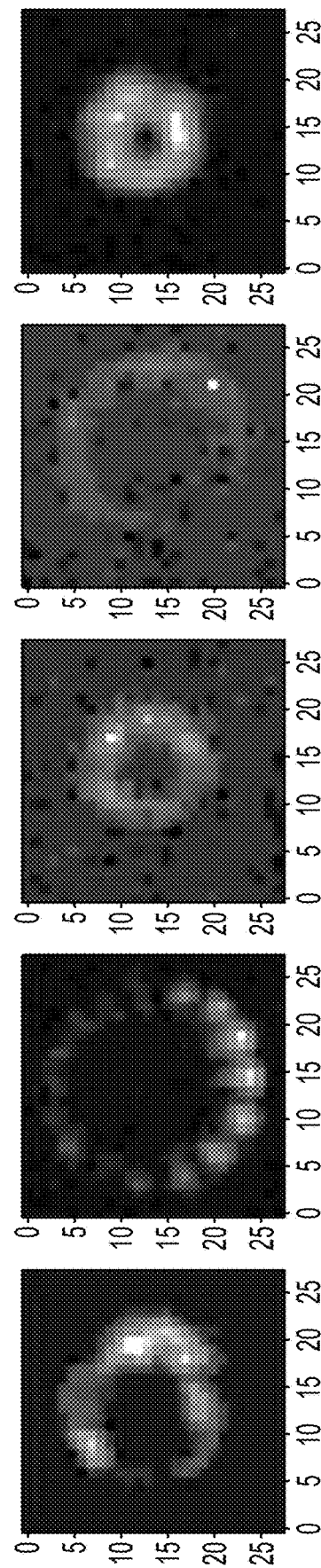

From FIG. 11B, it is clear that it is hard to recognize the modes with the turbulence effect. LG modes are especially difficult because the only distinctive feature is the waist of the beam. The Mux-LG modes are, however, more distinctive because there are two features: the beam waist and the number of petals.

The total number of images is 96,000 for the interception side. 84,000 images are used for training and 12,000 for testing, which results in 87.5% for training and 12.5% for testing. The 12,000 images for testing data are equally divided for each of the three types of turbulence. In other words, there are 4,000 images for weak turbulence at five different intercepted powers, and the same goes for moderate and strong turbulence, which will add up to 12,000 in total.

Figure 11C:
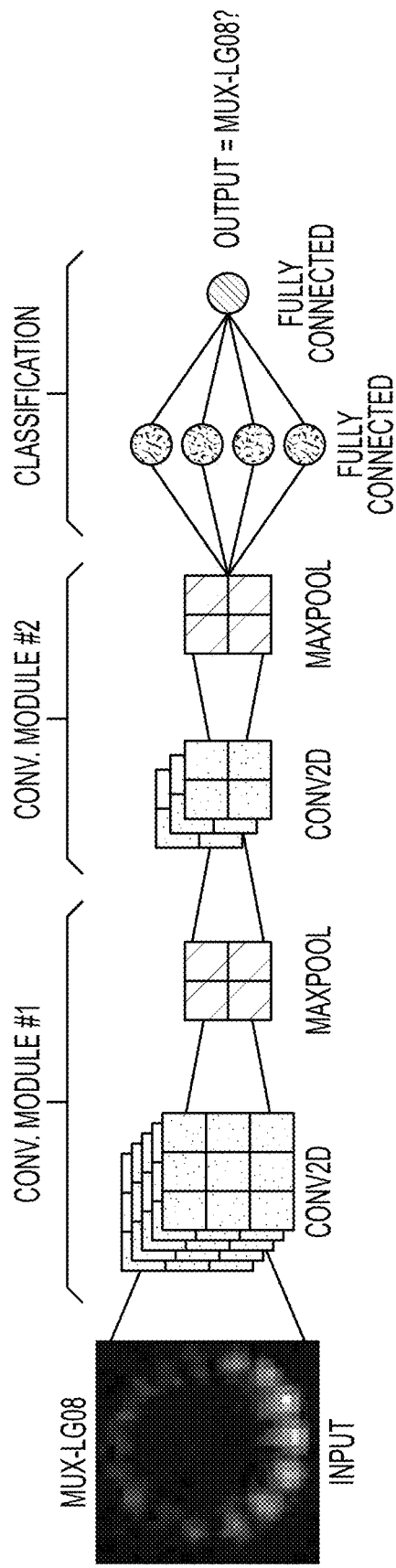
FIG. 11C shows an approximation of a deep learning model.

Since the datasets are a set of images, a classification algorithm is needed. A CNN (convolutional neural network) is selected as the machine learning algorithm because it is the best algorithm for image recognition. 7 hidden layers are used for the model, which makes it a deep learning model (see FIG. 11C). The 84,000 images of the interception dataset are trained using this model. For five epochs, the training accuracy of the model achieved 81.2% accuracy, which is a remarkable result due to the high impact of the turbulence on the modes while having different intercepted power. After training the machine learning system with the CNN algorithm, the datasets were tested.

Figure 11D:
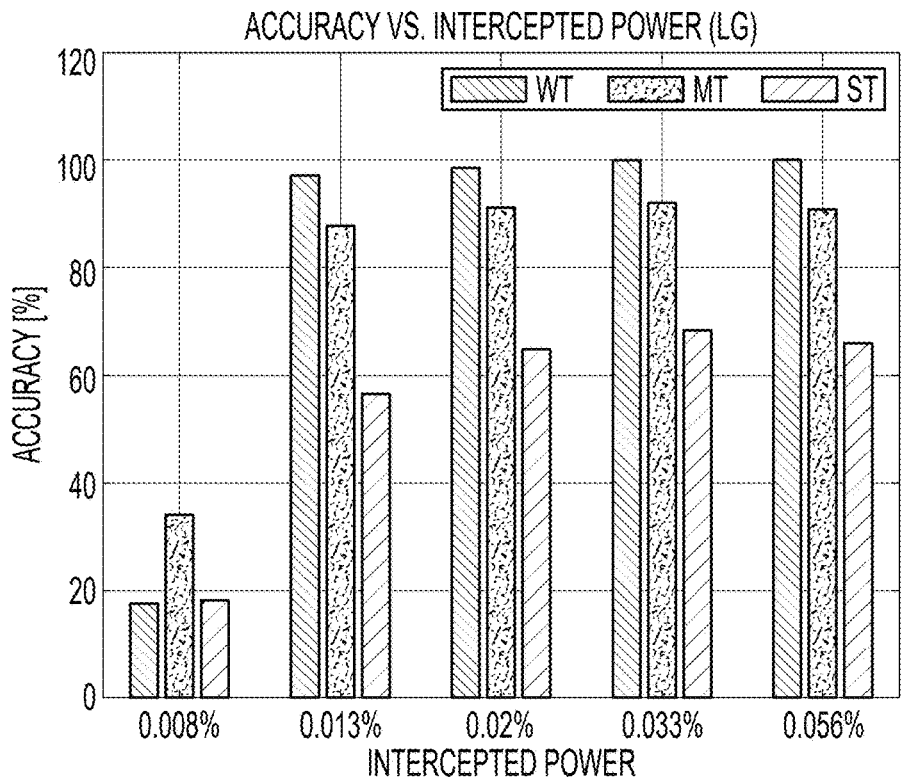
FIG. 11D is a graph showing accuracy vs. intercepted power (LG).
Figure 11E:
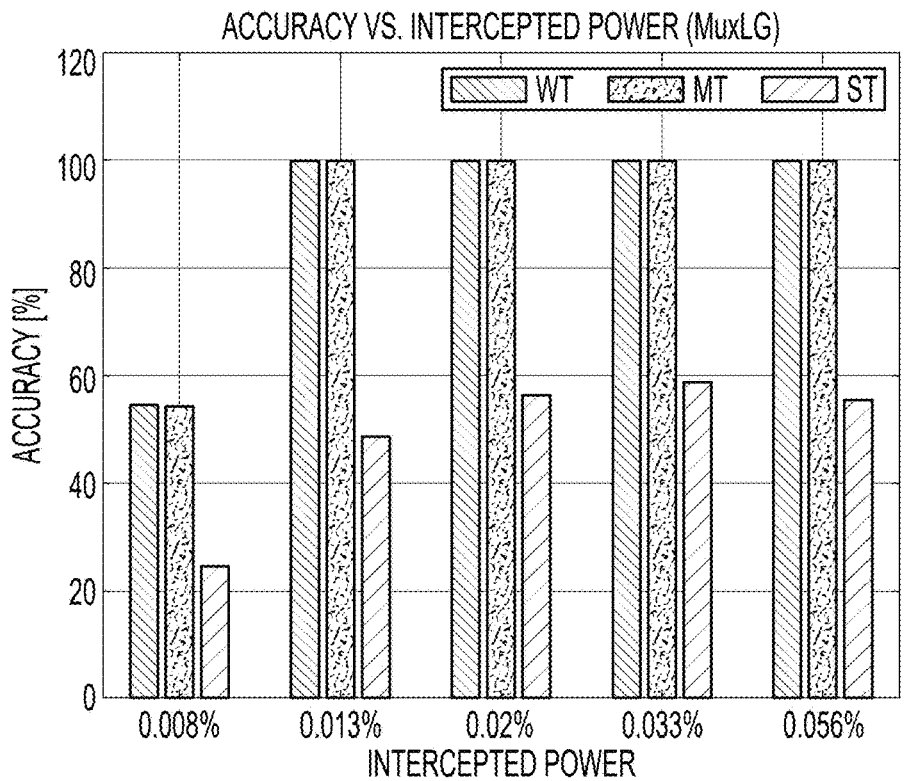
FIG. 11E is a graph showing accuracy vs. intercepted power (Mux-LG).

FIG. 11D and FIG. 11E are graphs showing the accuracy percentage along with the intercepted power at the interception side. Each bar on the graph represents a different level of turbulence for all modes. When the intercepted power was higher, the accuracy was also higher. Additionally, it is noted that the accuracy of the Mux-LG mode was better than the LG mode.

Figure 11F:
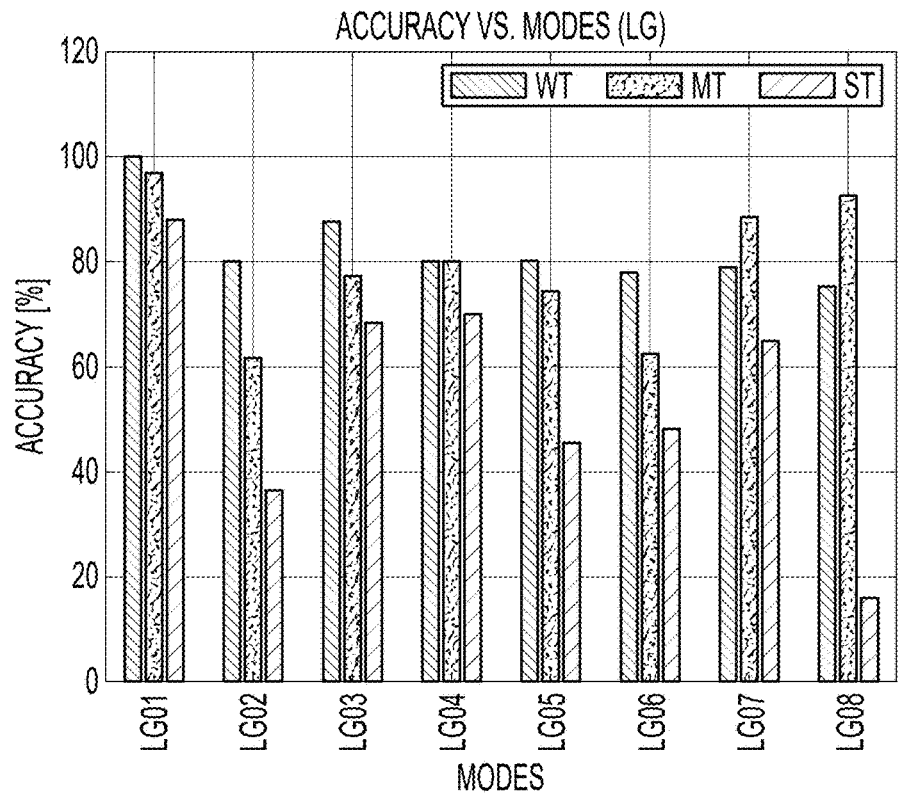
FIG. 11F is a graph showing accuracy vs. modes (LG).
Figure 11G:
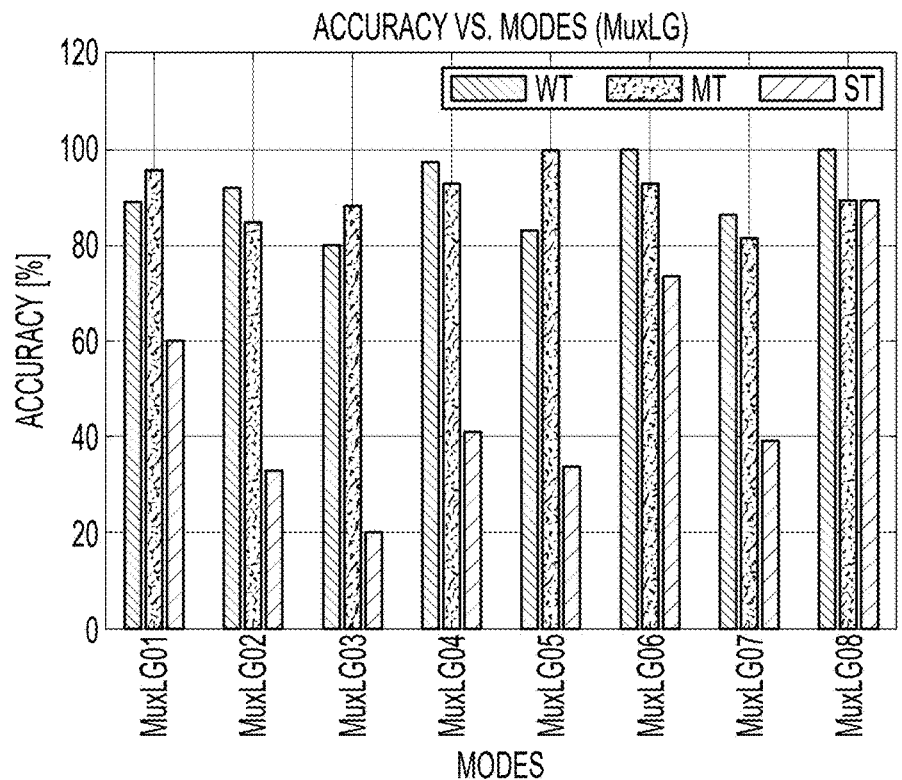
FIG. 11G is a graph showing accuracy vs. modes (Mux-LG).

FIG. 11F and FIG. 11G are graphs showing the accuracy percentage along with the modes at the interception side. Each bar on the graph represents a different level of turbulence for all intercepted power. When the level of turbulence was weak or moderate, the accuracy was high. However, when there was strong turbulence, the accuracy decreased because the image became more distorted. Overall, it was found that the Mux-LG mode performed better than the LG mode, because it is more distinctive and can be easily predicted by the model.

Figure 11H:
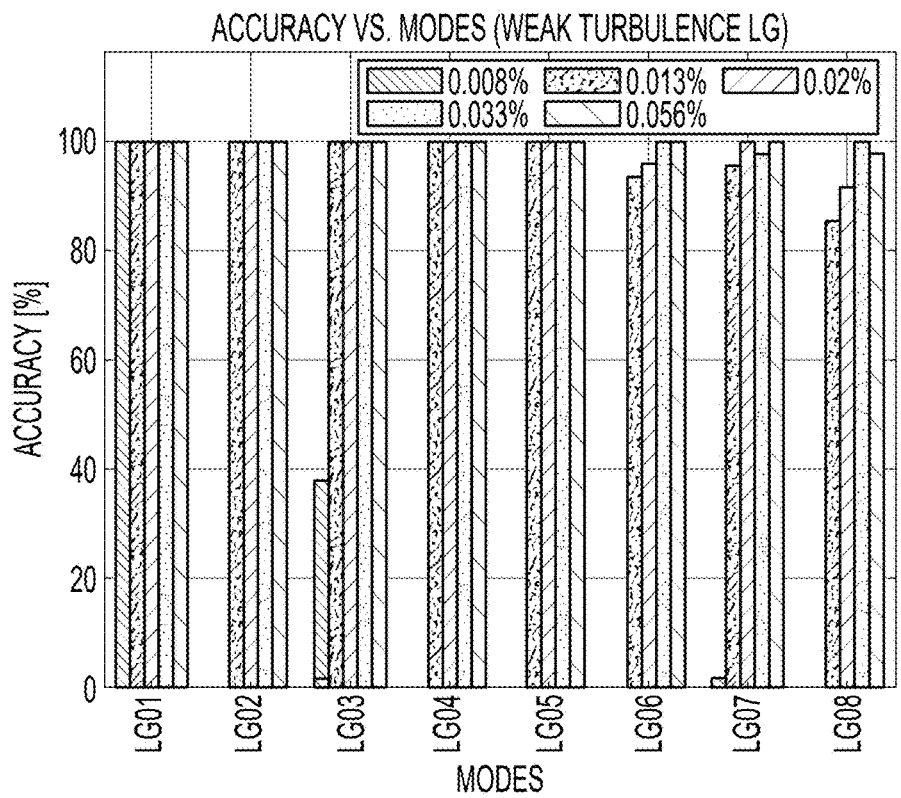
FIG. 11H is a graph showing accuracy vs. modes (WT LG).
Figure 11I:
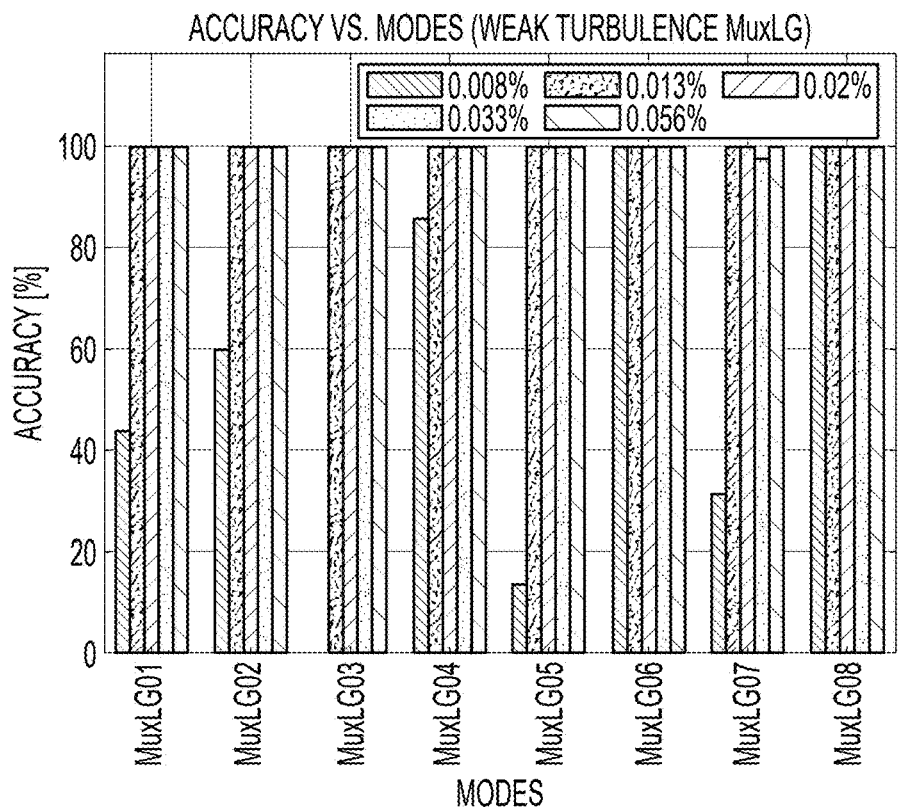
FIG. 11I is a graph showing accuracy vs. modes (WT Mux-LG).
Figure 11J:
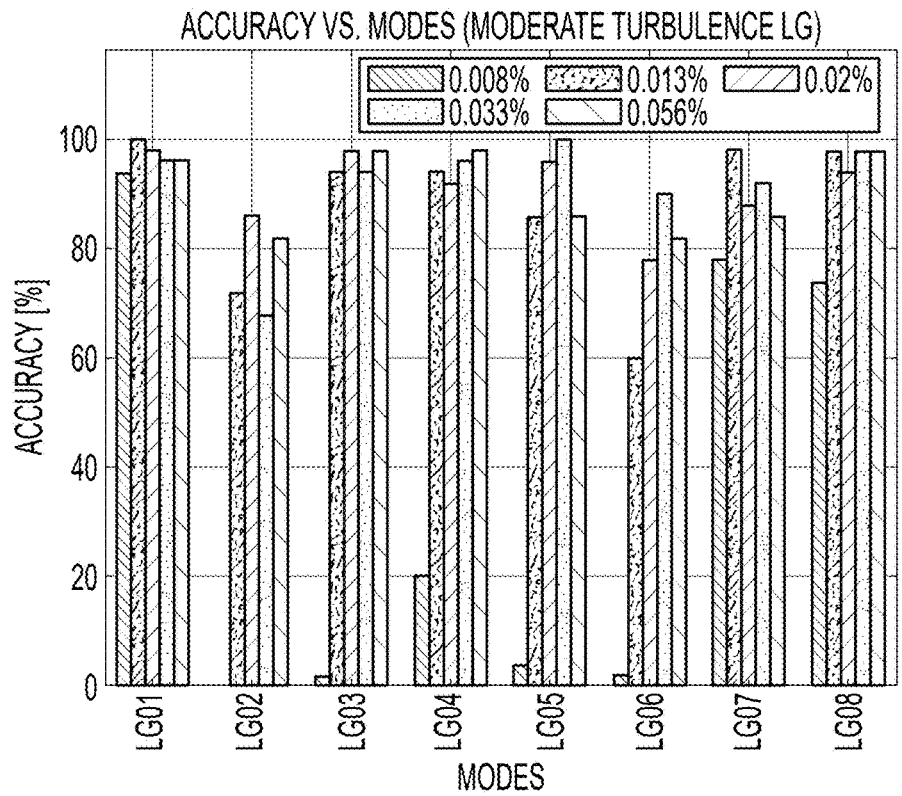
FIG. 11J is a graph showing accuracy vs. modes (MT LG).
Figure 11K:
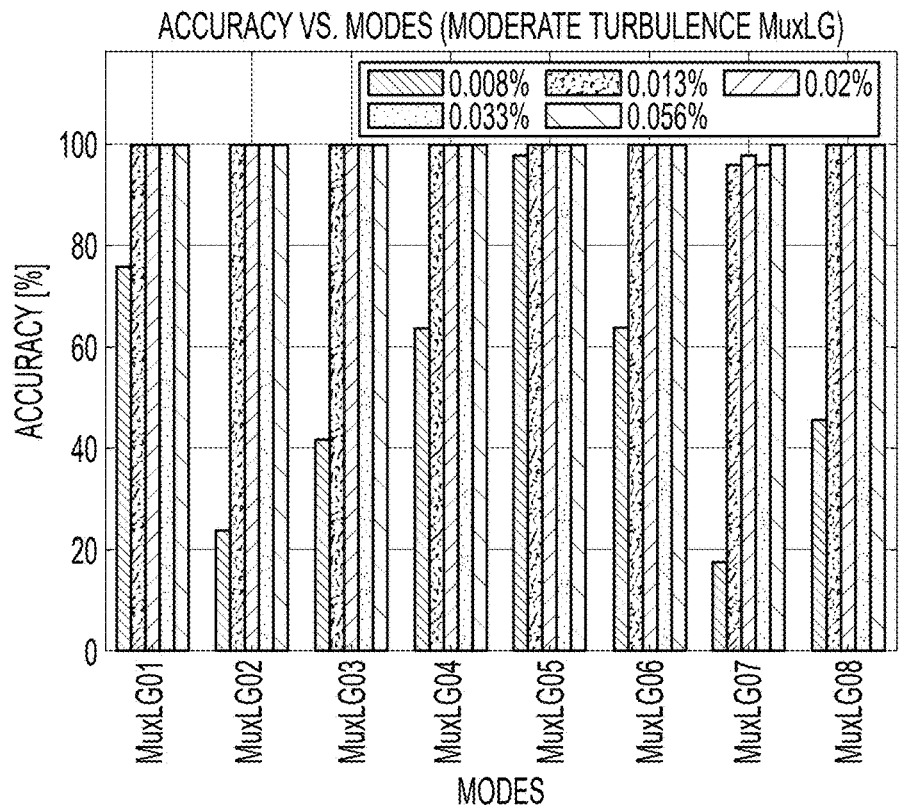
FIG. 11K is a graph showing accuracy vs. modes (MT Mux-LG).
Figure 11L:
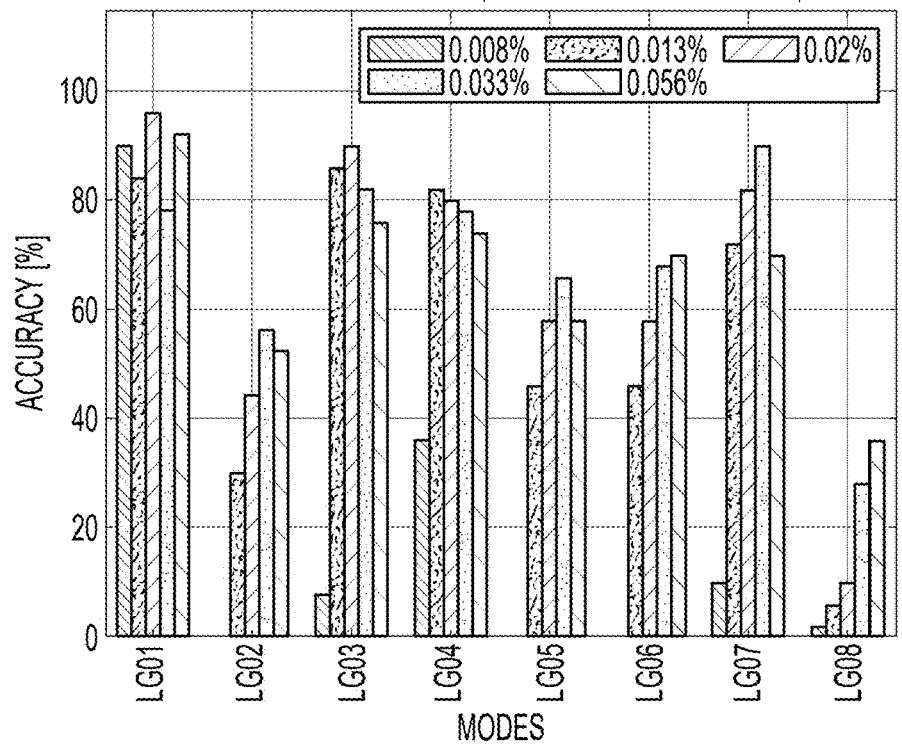
FIG. 11L is a graph showing accuracy vs. modes (ST LG).
Figure 11M:
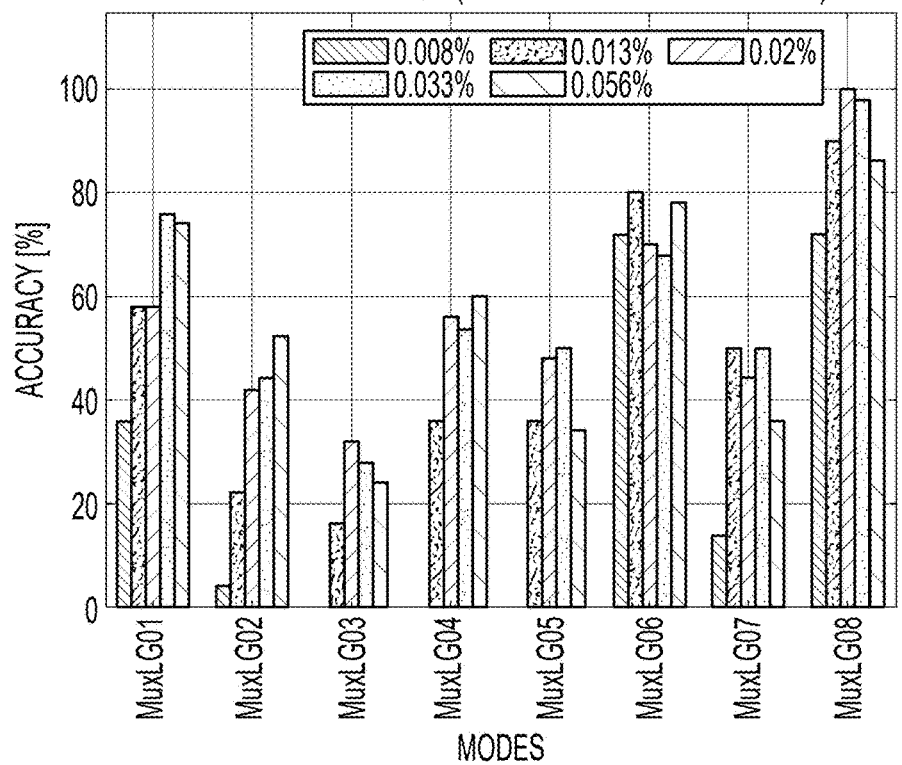
FIG. 11M is a graph showing accuracy vs. modes (ST Mux-LG).

FIG. 11H and FIG. 11I are graphs showing the accuracy percentage along with the modes for weak turbulence at the interception side. Each bar on the graph represents a different intercepted power. FIG. 11J and FIG. 11K are graphs that show the accuracy percentage along with the modes for moderate turbulence. FIG. 11L and FIG. 11M are graphs showing the accuracy percentage along with the modes for strong turbulence. The Mux-LG mode performed better than the LG mode for weak and moderate turbulence. However, in strong turbulence, the LG mode may sometimes perform better. Additionally, it is noted that a higher intercepted power leads to higher accuracy. There is a certain percentage of intercepted power where signals can be transmitted without being detected by an interceptor.

FIG. 11N and FIG. 11O are graphs that show the confusion matrix for the interception and receiver side where the diagonal values represent the number of correctly classified images for each mode. However, the rest of the matrix values represent the misclassification with all other modes. It is observed that the interception side performs better than the receiver side, and this is because a low noise CCD camera is used on the interception side which is more sensitive than the CCD camera at the receiver side. Furthermore, the results of the receiver side will behave similarly to the interception side. The x-axis and y-axis are labeled from 1 to 8 to represent LG01 to LG08 modes and from 9 to 16 to represent MUX-LG01 to MUX-LG08 modes.

It is to be understood that the system and method for transmitting signals in a free space optics communication system are not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

The invention claimed is:

1. A free space optics system, comprising:
    a transmitter for generating an orbital angular mode (OAM) laser signal; and
    a receiver comprising:
        a beam splitter for receiving the OAM laser signal;
        a charge coupled device (CCD) camera for receiving the OAM laser signal from the beam splitter and imaging the OAM laser signal; and
        a computing device in communication with the CCD camera, wherein the computing device is configured to determine a power of the OAM laser signal from images taken by the CCD camera to detect interception of the OAM laser signal.

2. The free space optics system as recited in claim 1, wherein the transmitter comprises:
    a laser for generating a laser signal; and
    a spatial light modulator (SLM) for receiving the laser signal and generating the OAM laser signal.

3. The free space optics system as recited in claim 1, wherein the OAM laser signal is a Multiplexed Laguerre Gaussian (Mux-LG) OAM laser signal.

4. The free space optics system as recited in claim 1, wherein the CCD camera is a low-noise CCD camera having a filter.

5. The free space optic system as recited in claim 1, further comprising a polarizer located between the beam splitter and the CCD camera.

6. The free space optics system as recited in claim 1, wherein the computing device is configured to detect the interception using a deep learning model.

7. The free space optics system as recited in claim 1, wherein the computing device is configured to detect the interception using a convolutional neural network (CNN).

8. A free space optics method for detecting interception of a signal, the method comprising:
    generating an orbital angular mode (OAM) laser signal using a transmitter;
    receiving the OAM laser signal at a beam splitter;
    directing the OAM laser signal from the beam splitter to a charge coupled device (CCD) camera;
    imaging the OAM laser signal with the CCD camera;
    transmitting images of the OAM laser signal from the CCD camera to a computing device; and
    determining, using the computing device, a power of the OAM laser signal from images taken by the CCD camera to detect interception of the OAM laser signal.

9. The free space optics method as recited in claim 8, wherein the OAM laser signal is generated by a laser directing a laser signal to a spatial light modulator (SLM).

10. The free space optics method as recited in claim 8, wherein the OAM laser signal is a Multiplexed Laguerre Gaussian (Mux-LG) OAM laser signal.

11. The free space optics method as recited in claim 8, wherein the CCD camera is a low-noise CCD camera having a filter.

12. The free space optic method as recited in claim 8, wherein a polarizer is located between the beam splitter and the CCD camera.

13. The free space optics method as recited in claim 8, wherein the detection of the interception is performed using a deep learning model.

14. The free space optics method as recited in claim 8, wherein the detection of the interception is performed using a convolutional neural network (CNN).

* * * * *